(12) United States Patent
Nakamura

(10) Patent No.: US 7,822,499 B2
(45) Date of Patent: Oct. 26, 2010

(54) PRODUCTION DESIGN SUPPORT FACILITY, PRODUCTION DESIGN SUPPORT PROGRAM, PRODUCTION DESIGN VERIFICATION DEVICE AND PRODUCTION DESIGN VERIFICATION PROGRAM

(75) Inventor: Masahiro Nakamura, Tottori (JP)

(73) Assignee: Lexer Research Inc., Tottori-shi (JP)

( * ) Notice: Subject to any disclaimer, the term of this patent is extended or adjusted under 35 U.S.C. 154(b) by 1118 days.

(21) Appl. No.: 10/587,040

(22) PCT Filed: Jan. 26, 2005

(86) PCT No.: PCT/JP2005/000978

§ 371 (c)(1),
(2), (4) Date: Jul. 24, 2006

(87) PCT Pub. No.: WO2005/073870

PCT Pub. Date: Aug. 11, 2005

(65) Prior Publication Data

US 2007/0162170 A1 Jul. 12, 2007

(30) Foreign Application Priority Data

Jan. 29, 2004 (JP) .............................. 2004-021632

(51) Int. Cl.
*G06F 19/00* (2006.01)
*G06F 7/60* (2006.01)
*G09B 25/00* (2006.01)

(52) U.S. Cl. .............................. 700/97; 700/182; 703/2; 434/79; 434/80

(58) Field of Classification Search ...................... 703/1, 703/2, 6; 434/79, 81, 96, 80; 700/97, 101, 700/102, 95, 98, 182

See application file for complete search history.

(56) References Cited

U.S. PATENT DOCUMENTS 5,717,598 A * 2/1998 Miyakawa et al. .......... 700/103

(Continued)

FOREIGN PATENT DOCUMENTS

JP 7-239866 A 9/1995

(Continued)

OTHER PUBLICATIONS

Nousch, Mathias et al., "CAD on the World Wide Web: Virtual Assembly of Furniture with BEAVER", 1999, Proceedings of the 4th Symposium on Virtual Reality Modeling language, pp. 113-119.*

(Continued)

*Primary Examiner*—Paul L Rodriguez
*Assistant Examiner*—Sheela Rao
(74) *Attorney, Agent, or Firm*—Westerman, Hattori, Daniels & Adrian, LLP

(57) ABSTRACT

Cooperation management means for cooperating and managing an assembly procedure data formed by showing a combination of assembly enabled components and an assembling order thereof and a component object data for displaying the components in a virtual space as a component object; object display means for displaying the component object in the virtual space based on the component object data; coordinate data acquisition means for acquiring coordinate data of the component object displayed in the virtual space by the object display means; and element working time output means for outputting the element working time required for an assembly of the components, based on assembly procedure data related to the above objects and cooperatively managed by the cooperation means are provided.

54 Claims, 30 Drawing Sheets

U.S. PATENT DOCUMENTS

| | | | |
|---|---|---|---|
| 6,725,184 B1 * | 4/2004 | Gadh et al. | 703/2 |
| 7,062,722 B1 * | 6/2006 | Carlin et al. | 715/850 |
| 2002/0184524 A1 * | 12/2002 | Steele et al. | 713/201 |
| 2005/0149219 A1 * | 7/2005 | Lilly et al. | 700/100 |
| 2006/0155402 A1 * | 7/2006 | Read | 700/97 |

FOREIGN PATENT DOCUMENTS

| | | | |
|---|---|---|---|
| JP | 9-168946 A | 6/1997 | |
| JP | 10-34458 A | 2/1998 | |
| JP | 10-229293 A | 8/1998 | |
| JP | 2000-24850 A | 1/2000 | |
| JP | 2000-141152 A | 5/2000 | |
| JP | 2000-148814 A | 5/2000 | |
| JP | 2001-166681 A | 6/2001 | |
| JP | 2001-222570 A | 8/2001 | |
| JP | 2002-366443 A | 12/2002 | |

OTHER PUBLICATIONS

International Search Report of PCT/JP2005/000978, date of mailing Mar. 8, 2005.

* cited by examiner

Fig.6

| COMPONENT SUPPLY UNIT OBJECT MANAGEMENT NUMBER | METADATA | COMPONENT NUMBER OF COMPONENT SUPPLY UNIT IN REAL SPACE | COMPONENT OBJECT MANAGEMENT NUMBER TO BE ABLE TO HOLD |
|---|---|---|---|
| BKT001 | PLT1 | bkt001 | A001 |
|  |  |  | A002 |
|  |  |  | A003 |
|  |  |  | A004 |
|  |  |  | A005 |
| BKT002 | PLT2 | bkt002 | A001 |
|  |  |  | A002 |
|  |  |  | A003 |
| ... | ... | ... | ... |

Fig.7

| COMPONENT OBJECT MANAGEMENT NUMBER | METADATA | COMPONENT NUMBER OF COMPONENT IN REAL SPACE | COMPONENT OBJECT MANAGEMENT NUMBER OF ASSEMBLY ENABLED COMPONENT |
|---|---|---|---|
| A001 | BRK | a001 | B001<br>B002<br>B003 |
| A002 | BRKLP | a002 | B004<br>B005<br>B006 |
| ... | ... | ... | ... |

Fig.8

| COMPONENT OBJECT MANAGEMENT NUMBER | METADATA | COMPONENT OBJECT DATA (REPRESENTING DATA) | JOINT DATA | MASS DATA | GRAVITY CENTER POSITION DATA | COMPONENT NUMBER |
|---|---|---|---|---|---|---|
| A001 | | | | | | a001 |
| A002 | | | | | | a002 |
| A003 | | | | | | a003 |
| A004 | | | | | | a004 |
| A005 | | | | | | a005 |
| A006 | | | | | | a006 |
| ... | ... | ... | ... | ... | ... | ... |

Fig.9

| COMPONENT SUPPLY UNIT OBJECT MANAGEMENT NUMBER | METADATA | COMPONENT SUPPLY UNIT OBJECT DATA (REPRESENTING DATA) | JOINT DATA | MASS DATA | GRAVITY CENTER POSITION DATA |
|---|---|---|---|---|---|
| BKT001 | | | | | |
| BKT002 | | | | | |
| BKT003 | | | | | |
| BKT004 | | | | | |
| BKT005 | | | | | |
| BKT006 | | | | | |
| BKT007 | | | | | |
| BKT008 | | | | | |
| ... | ... | ... | ... | ... | ... |

Fig.10

| ELEMENT WORK NAME | COMPONENT OBJECT MANAGEMENT NUMBER OF ASSEMBLED COMPONENT IN THE ELEMENT WORK | | | | | |
|---|---|---|---|---|---|---|
| P1 | A001 | | | | | |
| P2 | A001 | A002 | | | | |
| P3 | A001 | A002 | A003 | | | |
| P4 | A001 | A002 | A003 | A004 | A005 | |
| P5 | B001 | B002 | | | | |
| P6 | B001 | B002 | B003 | | | |
| P7 | B001 | B002 | B003 | B004 | | |
| P8 | B001 | B002 | B003 | B004 | B005 | |
| ... | ... | ... | ... | ... | ... | ... |

Fig.11

| STEP NAME | COMPONENT OBJECT MANAGEMENT NUMBER OF ASSEMBLED COMPONENT IN THE STEP | | | | | |
|---|---|---|---|---|---|---|
| K1 | A001 | A002 | A003 | A004 | | |
| K2 | A001 | A002 | A003 | A004 | A005 | |
| K3 | B001 | B002 | B003 | | | |
| K4 | B001 | B002 | B003 | B004 | B005 | B006 |
| K5 | C001 | C002 | C003 | C004 | | |
| K6 | C001 | C002 | C003 | C004 | C005 | C006 |
| ... | ... | ... | ... | ... | ... | ... |

Fig.18

| COMPONENT OBJECT MANAGEMENT NUMBER | COMPONENT OBJECT MANAGEMENT NUMBER | DISTANCE (m) | ELEMENT WORKING TIME (sec) |
|---|---|---|---|
| A001 | A002 | 0.50 | 1.0 |
| | | 1.00 | 1.1 |
| | | 1.50 | 1.2 |
| | | 2.00 | 1.3 |
| | | 2.50 | 1.4 |
| A001 | A003 | 0.50 | 1.0 |
| | | 1.00 | 1.5 |
| | | 1.50 | 2.0 |
| ... | ... | ... | ... |

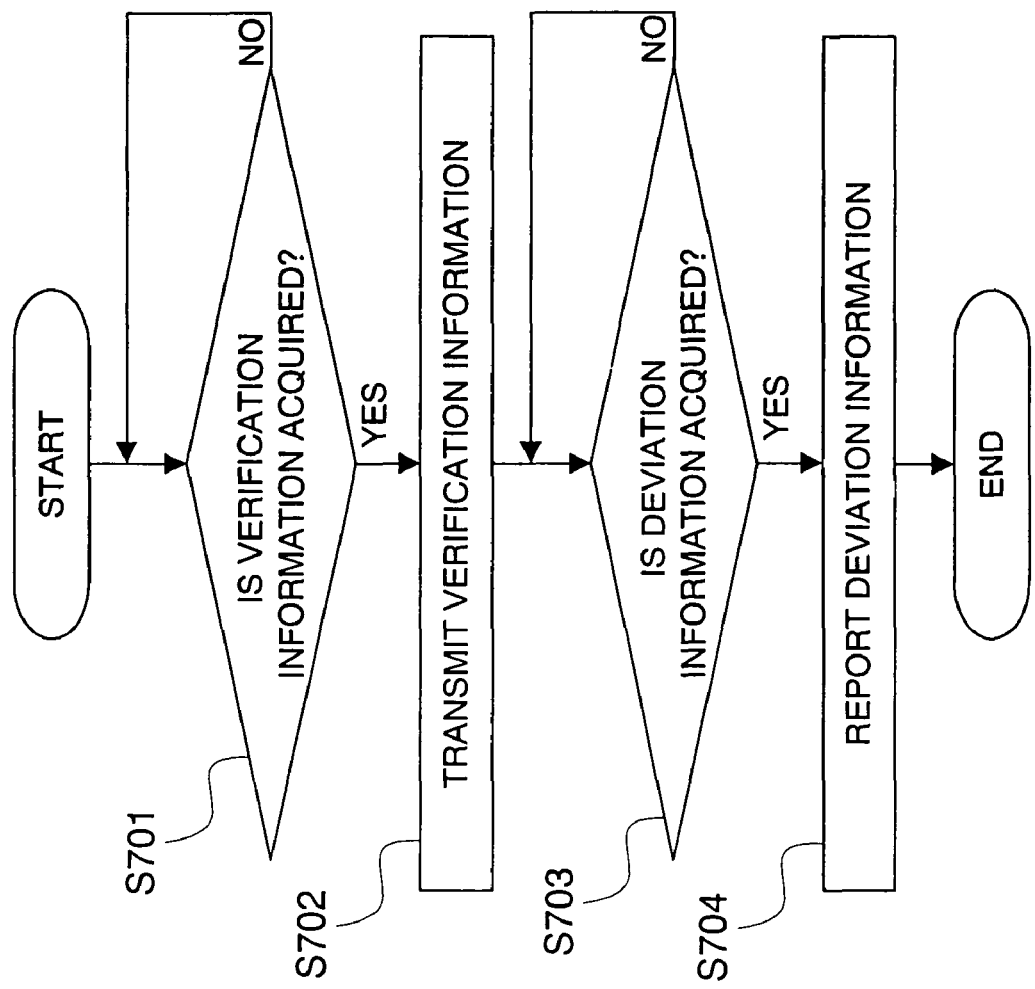

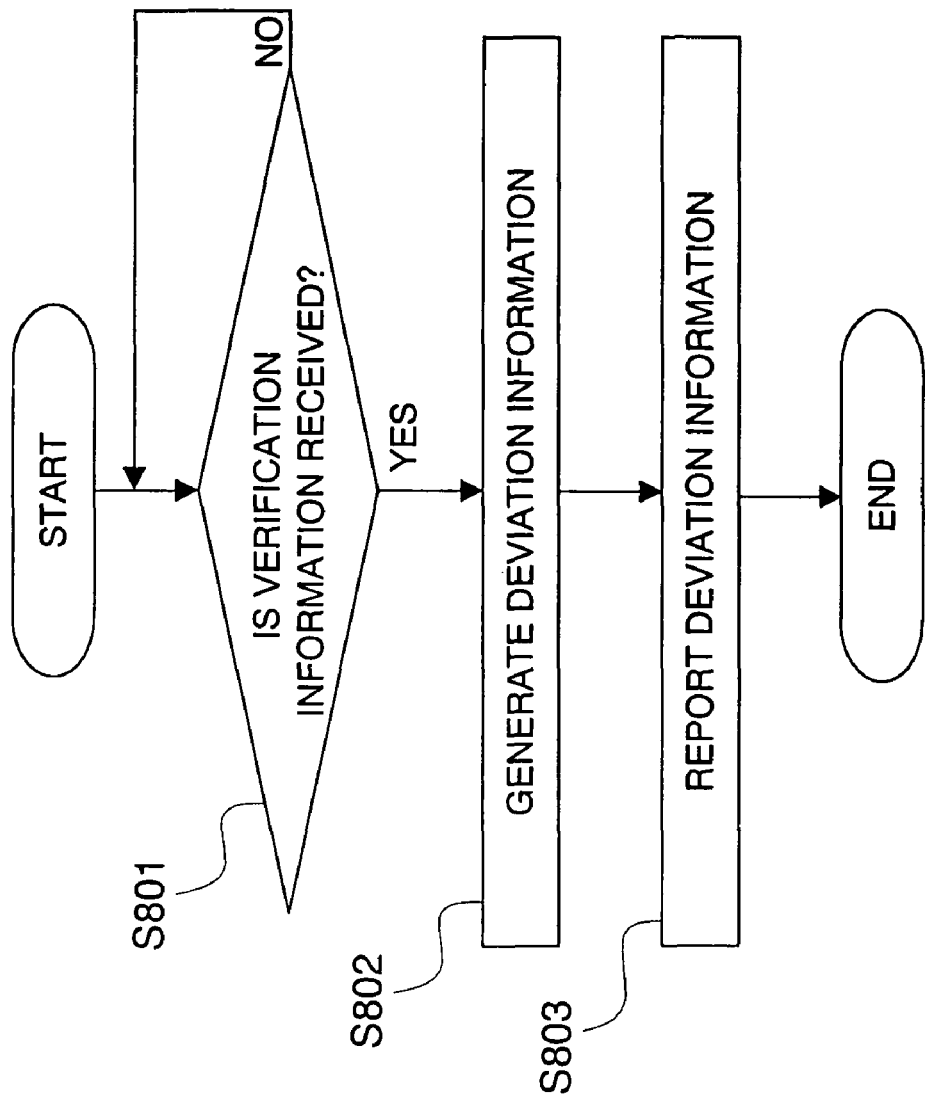

PRODUCTION DESIGN SUPPORT FACILITY, PRODUCTION DESIGN SUPPORT PROGRAM, PRODUCTION DESIGN VERIFICATION DEVICE AND PRODUCTION DESIGN VERIFICATION PROGRAM

TECHNICAL FIELD

The present invention relates to facility for supporting a production design capable of performing a production design of a prescribed product formed by assembling a prescribed component present in a real space by displaying the component on a virtual space, and a program for making the equipment perform a prescribed operation.

BACKGROUND ART

When a prescribed product constituted by each kind of component is produced, it is important what combination of components is selected and what assembly procedure is adopted to assemble the components, to be competitive in "production". For example, in a multi-kind, small volume production, it is important to constitute required components for each product and change a constitution correctly and easily as much as possible. In order to realize the aforementioned matter, there is disclosed a technique to make and manage a database of each kind of component (see, patent document 1, for example).

Also, the technique for studying a spatial relation such as an arrangement and hit between components is disclosed. Specifically, it is previously studied in a virtual space whether or not a space between components can be ensured so that the hand of a worker can be inserted during assembling the components (see, patent document 2, for example).

Patent document 1: Japanese Patent Laid-Open No. 2000-148814 (pages 4 to 7, and FIG. 1)

Patent document 2: Japanese Patent Laid-Open No. 10-34458 (pages 3 to 4, and FIG. 7)

DISCLOSURE OF THE INVENTION

Problems to be Solved by Invention

However, the conventional art absolutely only makes the database of the components, and is only capable of studying whether or not an element work can be performed based on the spatial relation between components in the element work. Even if this is possible, it is only possible to know a working time in a certain element work, and an assembling procedure (process) is never studied.

Accordingly, the conventional art involves a problem that when studying the assembling procedure required for the production design, an optimal procedure is not allowed to be obtained while estimating the spatial relation between components, and is forced to depend on an experience of a person who performs the production design.

In addition, the problem of a so-called localization is also involved, such that when the same product produced domestically is produced externally, for example, even if the component used in assembling is the same regardless of producing it domestically or externally, under a significant influence of an environment of an assembling site (such as production volume and worker's physical constitution), the same productivity rate domestically obtained is not obtained externally, thereby making it impossible to smoothly respond to the era of promoting overseas production.

As described above, in the conventional art, the production design is studied only from an aspect of the spatial relation between components, the production design is studied only in terms of the element work in the assembling procedure, and the production design is not performed by studying over the whole process in consideration of the special relation, involving the problem that it is forced to depend on an overall ability of an individual person who depends on the experience and thus can not flexibly respond to the era of promoting overseas production.

In view of the above-described problem, the present invention is provided, and a main object of the present invention is to provide a high-performance production design support facility capable of performing the production design over the whole process while studying the spatial relation between components, and capable of being easily used and treated in a general-purpose manner by anyone in a world of production in which an intensified competition about positively promoting overseas production is forced.

Means to Solve the Problem

Specifically, the production design support facility of the present invention is designed to be capable of performing a production design of a prescribed product present in a real space and formed by assembling prescribed components, by displaying the components in a virtual space, comprising: cooperation management means for associating assembly procedure data showing combination of the assembly enabled components and assembling order thereof with component object data for displaying the component in the virtual space as a component object and managing them; object display means for displaying the component object in the virtual space based on the component object data; coordinate data acquisition means for acquiring coordinate data of the component object displayed in the virtual space by the object display means; and element working time output means for outputting an element working time required for an assembly of the components, on the basis of each coordinate data of one component object and the other component objects acquired by the coordinate data acquisition means, and assembly procedure data related to the objects and cooperatively managed by the cooperation means.

According to this structure, since individually independent assembly procedure data and the component object data are cooperated by the cooperation management means, the production design is effectively performed by effectively linking the study of the whole process and the study of the spatial relation of a component arrangement. In addition, a result of the study can be known by a specific value such as an element working time. Therefore, the production design over the whole process can be performed from the assembly procedure data as a prior example by using the experience of others, while an individual experience is dispensed with. Particularly, when the component object is displayed in the virtual space, the coordinate data acquisition means acquires the coordinate data of the displayed component object, and based on the coordinate data thus acquired, the element working time is outputted. Therefore, the above-described localization problem does not occur, and the production design can be promoted significantly easily.

Namely, there is provided a high-performance production design support facility capable of performing the production design over the whole process while studying the spatial relation between components, and capable of being easily used and treated in a general-purpose manner by anyone in a world of production in which an intensified competition about positively promoting overseas production is forced.

In addition, this production design support facility has assembly enabled relation determination means for determining whether or not one component and the other components related to the component object displayed in the virtual space have assembly enabled relation, based on the assembly procedure data managed by the cooperation management means, wherein when the assembly enabled relation determination means determines that the components have assembly enabled relation, the element working time output means outputs the element working time required for the assembly of the components, based on each coordinate data of one component object and the other component objects acquired by the coordinate data acquisition means. With this structure, since the cooperation management means manages the assembly procedure data and the component object data by associating them, each of them can be independently treated, thus improving a working efficiency. Also, the assembly enabled relation determination means dynamically determines whether or not the component present in the virtual space is in a state of assembly enabled relation, based on the assembly procedure data managed by the cooperation management means, and based on a determination result, the element working time output means outputs the element working time related to the assembly thereof, and therefore the worker can know the element working time related to the assembly of the component object, by a significantly simple work such as displaying the component object at a desired position in the virtual space. Namely, an optimal design of a production line can be easily performed by any one by using the assembly procedure data as a prior example, while the individual experience is dispensed with.

Also, in order to surely know that the components are not in an assembly enabled state, and in order not to impose unnecessary burden on the worker, it is desirable to have first report means for reporting the information showing that the components are not in assembly enabled relationship in a combination of the components in the assembly procedure data, when the assembly enabled relation determination means determines accordingly.

Then, in order to surely report the combination of the assembly enabled component to the worker and improve workability, it is desirable that the first report means reports the information showing that the components are not in the assembly enabled relationship, or the information suggesting the combination of assembly enabled components, instead of the information showing that the components are not in the assembly enabled relationship.

In addition, in order to surely know that there is something wrong with the assembly procedure of a work and in order not to impose unnecessary burden on the worker, it is desirable that the second report means reports the information showing that the components are not in the assembly enabled relationship in the combination order in the assembly procedure data, when the assembly enabled relation determination means determines accordingly.

In addition, in order to surely report to the worker the assembly procedure to be able to assemble and improve the workability, it is desirable for the second report means to report the information showing that the components are not in the assembly enabled relationship, or the information suggesting an assembly enabled assembly procedure, instead of the information showing that the components are not in the assembly enabled relationship.

Further, there is provided object moving instruction reception means for receiving an instruction to move the component object displayed in the virtual space to an arbitrary position in the virtual space, as an object moving instruction, wherein the object display means is adapted to display the component object according to the object moving instruction received by the object moving instruction receiving means. According to this structure, an arrangement position of the component can be arbitrarily changed, and the element working time at a place thus changed can be known.

Further, there is provided the object display means displays a component supply unit for supplying a prescribed component in the virtual space as a component supply unit object, based on component supply unit object data; the cooperation management means cooperates and manages assembly procedure data and the component supply unit object data, assembly procedure data further showing a combination of the prescribed component and the component supply unit object; and the object moving instruction reception means is further adapted to receive an instruction to move the component supply unit object displayed by the object display means, to the arbitrary position in the virtual space, as an object moving instruction, the production design can be performed based on the component supply unit for supplying components which is practically used on a production line, and therefore this structure can be promptly applied to the manufacturing line.

When the virtual space is constituted of one or a plurality of virtual space elements, and the virtual space element, the component object, and the component supply unit object have joints by which they can be mutually connected, and the movement of the object to the arbitrary position on the virtual space is performed following the connection of the joints, the movement of the object is performed following the connection of the joints when the object is arranged on the virtual space. Therefore, even if the object is arranged at an indefinite position, a delicate and fine operation is not required; because the object automatically moves to an assembly enabled position and is connected thereto by joint. This improves operability.

In addition, in order to promote laborsaving of the production design by using the received assembly procedure data, it is desirable to provide an assembly procedure data receiving means for receiving the assembly procedure data related to the prescribed product or the assembly procedure data related to other product different from the prescribed product.

In addition, when there is provided an assembly procedure data edit instruction receiving means that receives the instruction to edit at least one data of the combination of the component and the assembling order in the assembly procedure data, the production design of the product that is becoming multifarious can be flexibly performed.

As a specific embodiment that associates the assembly procedure data and the component object data, the component is managed by component management number, and the component object data is managed by component object management number, and by associating the component number and the component object management number and associating at least one of the combination of the component and the assembling order thereof, and the component number and the component object management number to obtain the assembly procedure data, the cooperation management means can manage the assembly procedure data and the component object data by associating them.

Even when the assembly procedure data and the component object data are managed by temporary component number, in order to flexibly performing the cooperation between the assembly procedure data and the component object data, it is desirable to describe the component object data by associating with metadata whereby a prescribed concept regarding the component related to the component object data or the component can be recalled.

Here, the metadata, whereby the component is recalled, means that the worker can directly imagine the component by this metadata, and the metadata, whereby the prescribe concept regarding the component is recalled, means that the worker can indirectly imagine the component by this metadata. Specifically, a development code or the like set in a development project of the product can be given as a former example. Meanwhile, a component name given by abbreviation is given as the latter example. For example, the component name "FRONT-BRK" displayed as "FRONT-BRAKE" corresponds to this case. Also, it is acceptable that "the prescribed concept can be imagined" as far as the worker involved in the production of the product can imagine, and the number of workers may be more than one.

Further, the metadata may be a generalized component name. This kind of metadata includes the data of the component named to show a certain category, the component named to show an attribute, and the component named to show a prescribed constitution. However, robustness is required to keep the worker from being confused with other component name. A person determines whether or not having the robustness, and the component name determined to have the robustness is received.

As a specific example of cooperation using the metadata, based on the metadata to be a search source and the metadata to be a search destination, a fitness determining means is provided for determining whether or not the metadata to be a search source and the metadata to be a search destination are fitted to each other, and when the fitting determining means determines it to be fitted to each other, the cooperation management means associates the metadata to be a search source and the metadata to be a search destination and manages them.

When the metadata includes at least a character string, in the character string in the metadata to be a search source and the metadata to be a search destination, the fitness determining means calculates the degree of appearance of the character string in one of the metadata, in the character string in the other metadata, and when the degree thus obtained shows a prescribed value or more, determines that the metadata to be a search source and the metadata to be a search destination are fitted to each other.

Incidentally, in order to reduce a cost as an overall production site by applying the cooperation management data to other product, it is preferable to have a cooperation management data storage means that stores the assembly procedure data and the component object data cooperatively managed by the cooperation management means, as cooperation management data in a state of cooperatively managed.

Also, in order to visually grasp dispersion and convergence of the element work, it is preferable to have a graphic element work display means that displays on a screen the element working time outputted by the element working time output means as a graphic element work, whereby the element working time is integrated into graphics so as to correspond to the length of the element working time.

When the product is completed through one or a plurality of steps, the steps are formed by combining one or a plurality of the element works, and a plurality of steps are present, the graphic element work display means arranges the graphic element works for each step in a prescribed order and displays them on the screen. According to this structure, the dispersion and convergence of the element works can be visually grasped per unit step, and the optimal design of the production line can be easily performed.

At this time, if the aforesaid prescribed order is a working order, the effect becomes remarkable.

In addition, in order to perform the design of a flexible production line, it is preferable to have a graphic element work display change instruction receiving means that receives a display change instruction related to the change of the display such as addition, deletion, and rearrangement of the graphic element works, and the graphic element work display means displays the graphic element works following the display change instruction received by the graphic element work display change instruction receiving means.

Based on the assembly procedure data managed by the cooperation management means, there is provided an assembly enabled relation determination means that determines whether or not one component and the other components related to the component object displayed on the virtual space have assembly enabled relation. When the graphic element work display change instruction receiving means receives the display change instruction, the assembly enabled relation determination means determines whether or not the component object related to the graphic element work received by the graphic element work display change instruction receiving means by referring to the cooperation management means. According to this structure, a convenience of a user can be improved. In this case, when the assembly enabled relation determination means determines that the component object related to the graphic element work received by the graphic element work display change instruction receiving means is in the assembly enabled state, the element work output means outputs the element working time corresponding to the component object related to the graphic element work received by the graphic element work display change instruction receiving means. According to this structure, the advantage becomes remarkable.

In addition, the element working time includes at least one of man element working time showing the working time by a worker and machine element working time showing the working time by a machine, and the element working time output means outputs the element working time by sorting it into the man element working time and the machine element working time. According to this structure, loads imposed on the worker and the machine can be known by sorting, and therefore more detailed production design can be performed.

As to assembly enabled one component object and the other component objects, the working time is changed by a separation distance thereof, therefore the element working time and the separation distance are paired and there is provided a distance corresponding element working time data storage means that stores a plurality of pairs of the element working time and the separation distance, so that the element working time output means determines and outputs the element working time corresponding to the separation distance by referring to the distance corresponding element working time data storage means. According to this structure, the machine is prevented from being imposed an extra load when outputting the element working time.

Meanwhile, the element working time is linearly or non-linearly changed in accordance with the separation distance between component objects on the virtual space, and the element working time output means calculates and outputs the element working time from the separation distance between component equipment objects on the virtual space. According to this structure, it is not necessary to prepare data for reference, and saving of energy can thereby be realized.

In addition, there is provided a worker characteristic data storage means storing worker characteristic data obtained by converting working characteristics of an individual worker related to the element working time into data, and the element working time output means outputs the element working time reflecting an individual characteristic of the worker, by using the worker characteristic data stored in the worker characteristic data storage means. According to this structure, further accurate element working time can be outputted.

Also, there is provided a tact time display means for displaying on a screen a tact time related to the product, whereby the tact time and the element working time are displayed in an overlapping manner, and a target of the production design can thereby be clarified. In addition, the element working time is outputted for each step, and this helps to adjust a balance of the element working time between steps.

Also, there are provided a tact time parameter receiving means that receives a tact time parameter (time schedule and total quantity of production) for setting the tact time, and a tact time calculator that calculates the tact time based on the tact time parameter received by the tact time parameter receiving means, and the tact time display means displays on screen the tact time calculated by the tact time calculating means. According to this structure, even if a fluctuation of the tact time occurs, the production design in accordance with the fluctuation can be easily performed.

In addition, there are provided a step display means for displaying on screen one or a plurality of steps by modeling them, and a step display change instruction receiving means for receiving the display change instruction related to the change of the display such as addition, deletion, and rearrangement of modeling steps. According to this structure, the addition, deletion, and change of steps can be performed, and the design of a flexible production line can thereby be performed from a macroscopic view point.

Also, there is provided an assembly enabled relation determination means that determines whether or not one component and the other components related to the component object displayed on the virtual space are in the assembly enabled relation, based on the assembly procedure data managed by the cooperation management means, and when the step display change instruction receiving means receives the display change instruction related to the change of the display such as addition, deletion, and rearrangement of the modeling steps, the assembly enabled relation determination means determines whether or not the component object related to the step received by the step display change instruction receiving means is in the assembly enabled state by referring to the cooperation management means. According to this structure, usability of a user is improved. Particularly, when the assembly enabled relation determination means determines that the component object related to the step received by the step display change instruction receiving means is in the assembly enabled sate, the element work output means outputs the element working time corresponding to the component object related to the step received by the step display change instruction receiving means. According to this structure, a remarkable effect can be exhibited.

In addition, the component object data has weight data showing a weight of the component on the real space, and the object display means displays the component supply unit for supplying a prescribed component on the virtual space as a component supply unit object, and in the cooperation management means, there is provided a total weight calculator that calculates total weight data of the total weight of one or a plurality of components related to one or a plurality of component objects that can be held by the component supply unit object. According to this structure, the load imposed on the worker due to component weight can be suitably estimated.

In addition, the component object data and the component supply object data have gravity center position data showing each gravity center position on the real space, and there is provided an arrangement balance state data calculator that calculates an arrangement balance state of the component held by the component supply unit as arrangement balance state data, from the gravity center position data and the weight data of the component object or the total weight data calculated by the total weight calculator, and the gravity center position data of the component supply unit object. According to this structure, a moment is calculated from the gravity center position data and the weight data, and the load imposed on the worker, which is further close to the actual situation, can thereby be estimated.

The arrangement balance state data calculator calculates the arrangement balance state data for each step shown by the assembling order of the assembly procedure data managed by the cooperation management means. According to this structure, it can be known what order should be taken to work for performing a stable work. That is, it is possible to previously know in time series what order should be taken to work for performing the stable work, and therefore the production design with further improved productivity becomes possible.

Also, there is provided a workability information output means that outputs workability information related to a workability of the worker, based on the arrangement balance state data calculated by the arrangement balance state data calculator. According to this structure, the workability of the worker can be specifically known as the workability information, and this is suitably utilized as an indicator of smoothly promoting the production design. In this case, when the workability information outputted by the workability information output means is warning information showing that the arrangement balance state is estimated to have an adverse affect on the work, and is component object exchange information related to the exchange of the component object required for improving the arrangement balance, the effect becomes remarkable.

In order to accurately perform production design content based on the element working time and converge studying operation on the embodiment to further accurate estimation, it is desirable to provide a verification information receiving means that receives verification information for obtaining a deviation between a production and the production design, the production being on the real space and performed so as to correspond to the production design content performed by using the virtual space, and a deviation information production means that produces deviation information showing the deviation of the production and the production design, based on the verification information and the production design content received by the verification information receiving means.

Here, the production design content is a concept of not only the element working time itself, but also the concept of making the element working time corresponded to each element work in a table, the concept of calculating the total time, and the concept of associating the element working time and the position on the virtual space of the component object related to the element working time.

In addition, when the verification information is positional information showing the position of an object arranged on the real space based on the production design content, and execution time information showing execution time of one or a plurality of element works actually executed on the real space based on the production design content, the effect becomes remarkable.

In addition, when the verification information receiving means is the verification information pick up means that picks up the verification information from an external prescribed unit, processing at almost real time can be realized.

Also, there is provided a deviation information output means that outputs deviation information produced by the deviation information production means as a desired embodiment of the present invention. Particularly, it is preferable that the deviation information output means is a deviation information transmitting means that transmits the deviation information to the external prescribed unit. Further, when the deviation information is correction information for correcting the deviation, the correction of the deviation can be efficiently performed.

When the production design content performed by the aforementioned production design support facility is executed on the real space, in order to perform an accurate execution corresponding to the production design content or converge the studying operation on the embodiment to further accurate estimation, preferably, a production design verification device used with the production design support facility has verification information acquisition means that acquires verification information for verifying the deviation between execution content and the production design content from the execution content performed on the real space based on the production design content, and verification information output means that outputs the verification information acquired by the verification information acquisition means to outside.

At this time, when the verification information is the positional information showing the position of the object arranged on the real space based on the production design content, and the execution time information showing the execution time of one or a plurality of element works actually executed on the real space based on the production design content, the effect becomes remarkable.

In addition, when the verification information output means is verification information transmitting means that transmits the verification information acquired by the verification information acquisition means to the production design support facility at real time, the processing at real time can be realized.

In addition, when the production design verification device has deviation information receiving means that receives from outside deviation information showing the deviation between the execution content and the production design content based on the verification information outputted to outside by the verification information output means, and deviation information report means that reports the deviation information received by the deviation information receiving means, the deviation can be efficiently known.

Particularly, when the deviation information receiving means is deviation information pick up means that picks up the deviation information from the production design support facility, the effect becomes remarkable.

Further, when the deviation information is correction information for correcting the deviation, the correction of the deviation can be efficiently performed.

In addition, when the production design verification device is radio communication available portable terminal equipment, the workability is greatly improved.

As described above, according to the production design support facility of the present invention, an individually independent assembly procedure data and the component object data are cooperated by the cooperation means. Therefore, the production design can be effectively performed, while the study on the whole process and the study on the spatial relation related to the component arrangement can be effectively interlocked, and a studied result can be known by a specific value such as the element working time. Accordingly, the production design over the whole process can be performed by using the experience of others from the assembly procedure data as a prior example, while an individual experience is dispensed with. Particularly, when the component object is displayed on the virtual space, the coordinate data of the component object displayed by the coordinate data acquisition means is acquired, and based on the coordinate data thus acquired, the element working time is outputted. Therefore, the aforementioned problem of localization does not occur, and the production design can be significantly easily promoted.

Namely, it is possible to provide a high performance production design support facility, in which the production design can be performed over the whole process while studying the spatial relation between components in combination, capable of being easily used and treated in a general-purpose manner by anyone in a world of production in which an intensified competition about positively promoting overseas production is forced.

BRIEF DESCRIPTION OF THE DRAWINGS

FIG. 6 is a view showing a storage aspect of a cooperation management data storage means in the embodiment;

FIG. 7 is a view showing the storage aspect of the cooperation management data storage means in the embodiment;

FIG. 8 is a view showing the storage aspect of a space element data storage means in the embodiment;

FIG. 9 is a view showing the storage aspect of the space element data storage means in the embodiment;

FIG. 10 is a view showing the storage aspect of an assembly procedure data storage means in the embodiment;

FIG. 11 is a view showing the storage aspect of the assembly procedure data storage means in the embodiment;

FIG. 18 is a view showing the storage aspect of a distance corresponding element working time data storage means in the embodiment;

FIG. 29 is a flowchart showing the operation of the production design verification device in the other embodiment; and FIG. 30 is a flowchart showing the operation of the production design support facility in the other embodiment.

BEST MODE FOR CARRYING OUT THE INVENTION

First Embodiment

Figure 1:
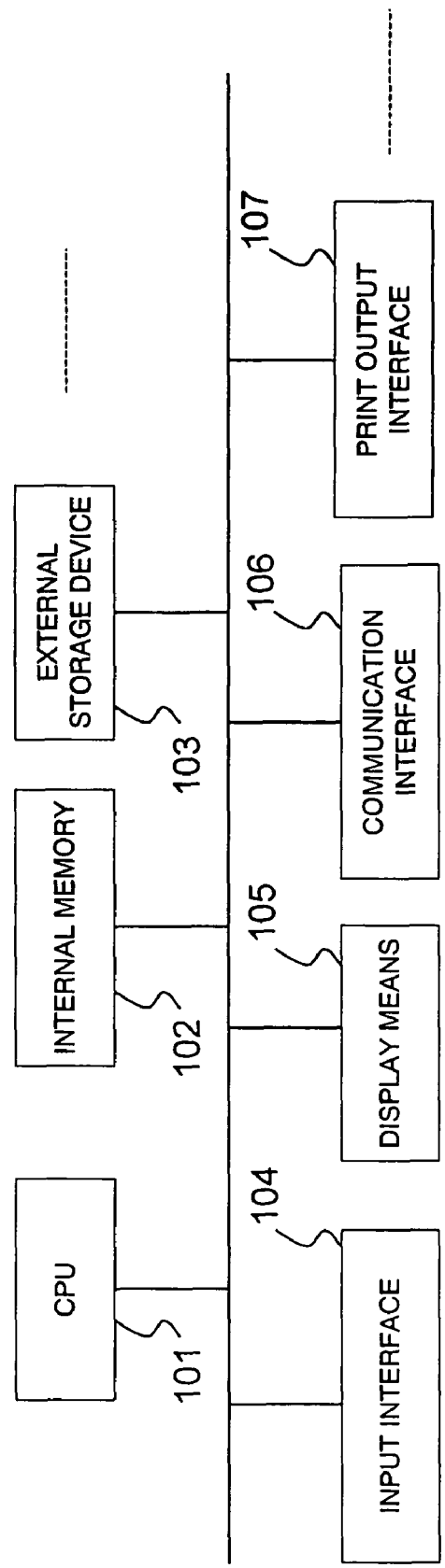
FIG. 1 is a block diagram of equipment of production design support facility according to one embodiment of the present invention.

An embodiment of the present invention will be explained hereafter by referring to the drawings.

According to a production design support device P as a production design support facility in one embodiment of the present invention, for example, when a production line of a new product is built, components actually assembled on the production line are suitably arranged in a virtual space as component objects, and by obtaining assembly time, etc, by an arrangement position thereof, an optimal design of an optimal production line can be performed.

Note that an explanation will be given on the assumption that a product explained in this embodiment is completed through a plurality of steps, and each step is also composed of a plurality of element works.

Also, each component is managed by a component management number, i.e. the number of component, and in addition, a component supply unit management number is given to the component supply unit for holding a prescribed component, so as to manage it.

Further, the virtual space of this embodiment realizes a program recorded in a record medium for control disclosed in Japanese Patent Laid-Open No. 11-272891 "METHOD AND DEVICE FOR CONTROLLING DISPLAY STATE IN THREE-DIMENSIONAL SPACE DISPLAY SYSTEM AND RECORD MEDIUM FOR CONTROL", by causing the production design support device P to execute it. Note that the technique of realizing the virtual space is not limited thereto.

Further, the object arranged in the virtual space is arranged with respect to the other objects and the virtual space, by using a method disclosed in Japanese Patent Laid-Open No. 11-272892 "DEVICE AND METHOD FOR MOVING AND ARRANGING OBJECT IN THREE-DIMENSIONAL SPACE DISPLAY SYSTEM".

A specific explanation will be given to the virtual space. The virtual space is formed by a plurality of virtual space elements. Note that the virtual space element may be a single number in accordance with an embodiment.

In addition, according to this embodiment, in each virtual space element, there is provided the joint as will be described later capable of being connected to the component object as will be described later and the component supply unit object as will be described later, and a movement to an arbitrary position in the virtual space of the component object and the component supply unit object (referred to as objects generically hereafter) is performed in accordance with the connection of the joint.

Namely, in a case of the object and the virtual space element having the joint, the arrangement is performed in accordance with the joint. Meanwhile, in the case of them not having the joint, they are arranged in accordance with the method described in the aforementioned "METHOD AND DEVICE FOR CONTROLLING DISPLAY STATE IN THREE-DIMENSIONAL SPACE DISPLAY SYSTEM AND RECORD MEDIUM FOR CONTROL" (Japanese Patent Laid Open No. 11-272892).

Hereafter, the production design support device P will be specifically explained.

The production design support device P has a general information processing function, and as shown in FIG. 1, has a CPU 101, an internal memory 102, and an external storage device 103 such as HDD or the like, an input interface 104 such as mouse and a keyboard, a display means 105 such as a liquid crystal display, a communication interface 106 for being connected to a communication line network such as an in-house LAN and internet, and a print output interface 107 for print-outputting to a printer (not shown), and so forth.

Figure 2:
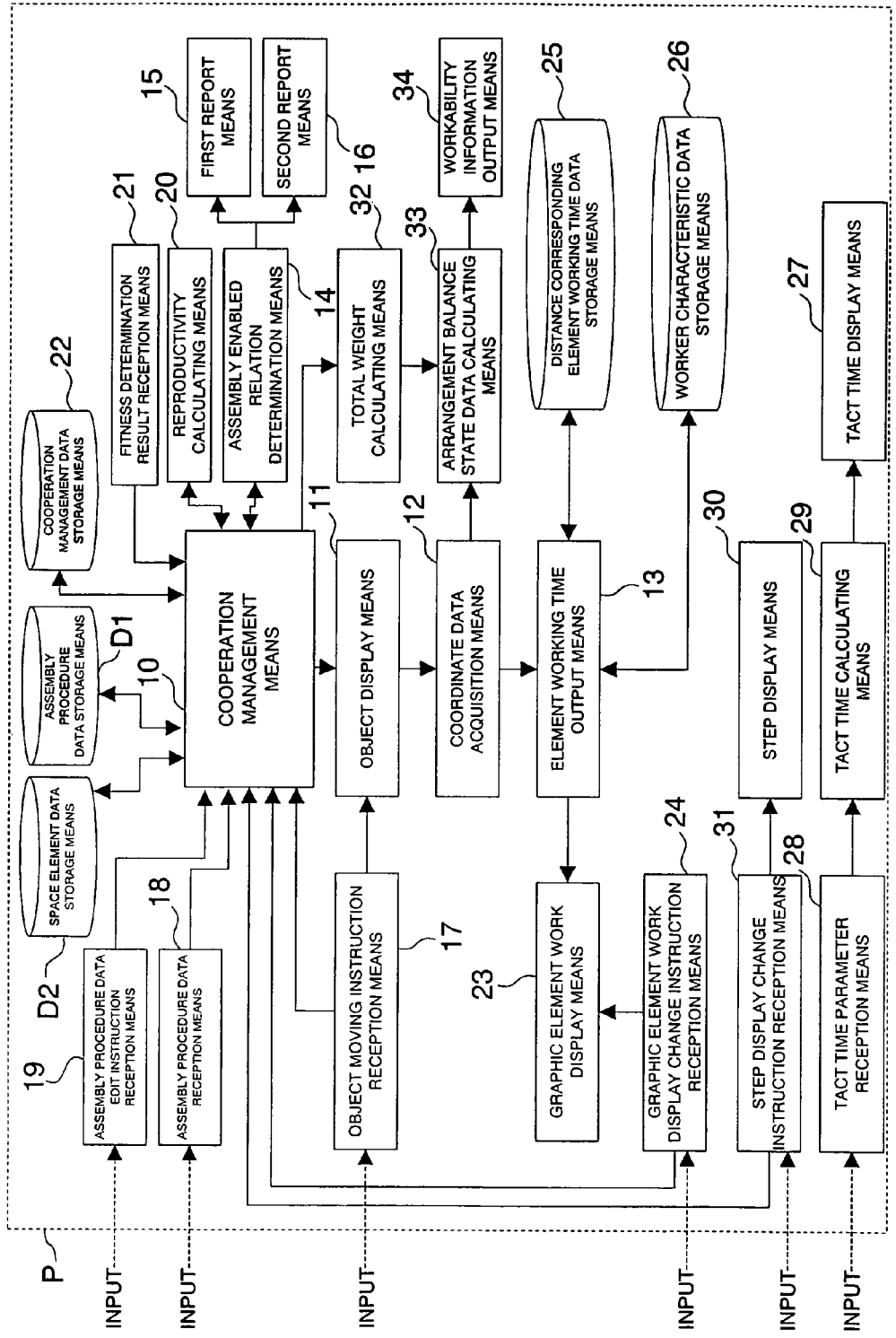
FIG. 2 is a block diagram of a function of the production design support facility in the embodiment.

Then, the production design support device P causes the CPU 101 and peripheral equipment to be activated in accordance with a production design support program stored in the internal memory 102, and as shown in FIG. 2, exhibits the function as cooperation management means 10, object display means 11, coordinate data acquisition means 12, element working time output means 13, an assembly enabled relation determination means 14, first report means 15, second report means 16, object moving instruction reception means 17, assembly procedure data reception means 18, assembly procedure data edit instruction reception means 19, reproductivity calculation display means 20, fitness determination result reception means 21, cooperation management data storage means 22, graphic element work display means 23, graphic element work display change instruction reception means 24, distance corresponding element working time data storage means 25, worker's characteristic data storage means 26, tact time parameter reception means 28, tact time calculating means 29, step display means 30, step display change instruction reception means 31, total weight calculating means 32, arrangement balance state data calculating means 33, and workability information output means 34, and so forth.

Each means will be described in detail hereafter. However, before this explanation, the assembly procedure data and space element data, which are treated by this production design support device P, will be explained. Note that in this embodiment, the metadata can be provided, for managing the assembly procedure data and the space element data by cooperating them.

Figure 3:
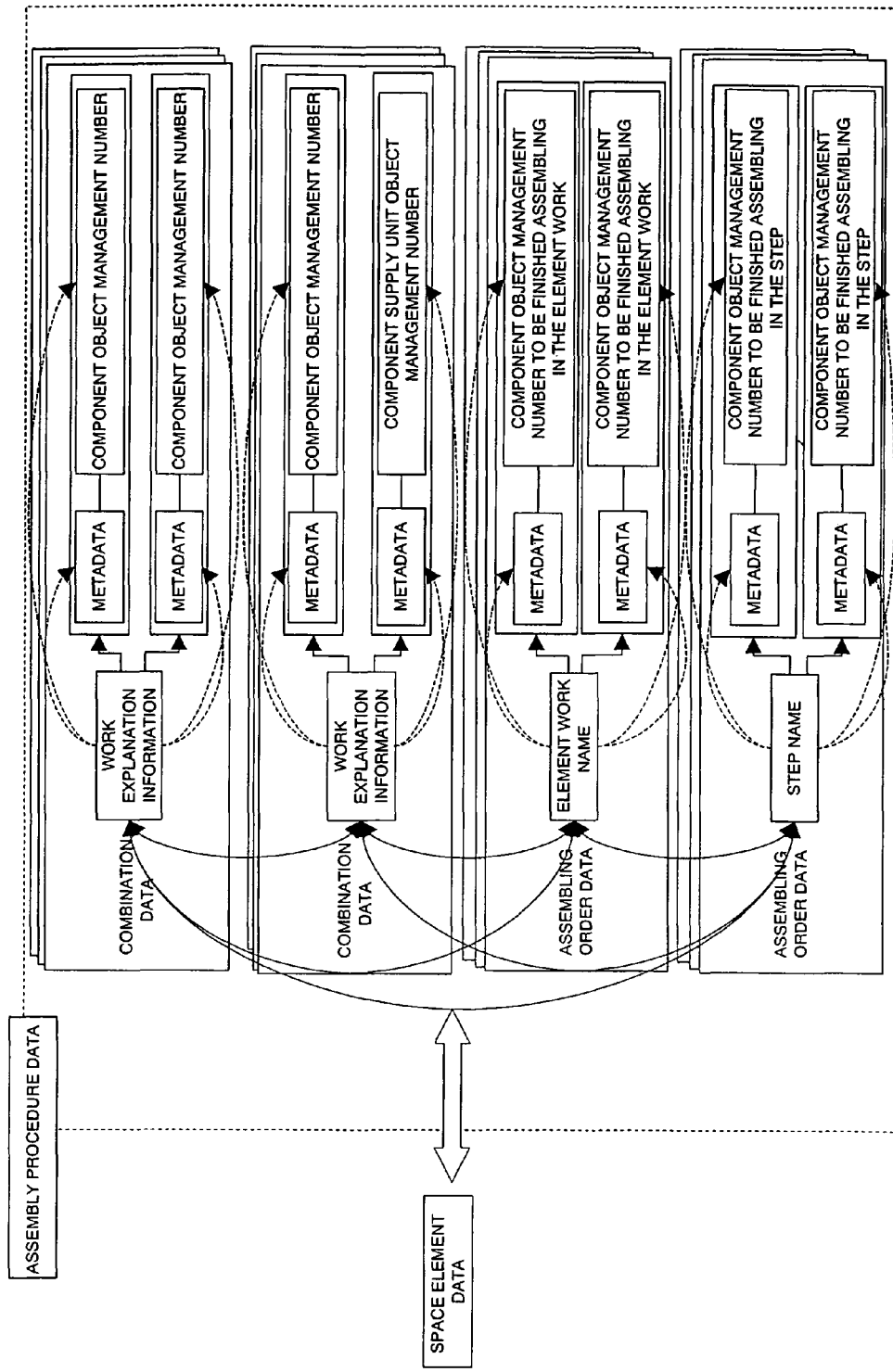
FIG. 3 is a view systematically showing space element data used in the production design support facility in the embodiment.
Figure 4:
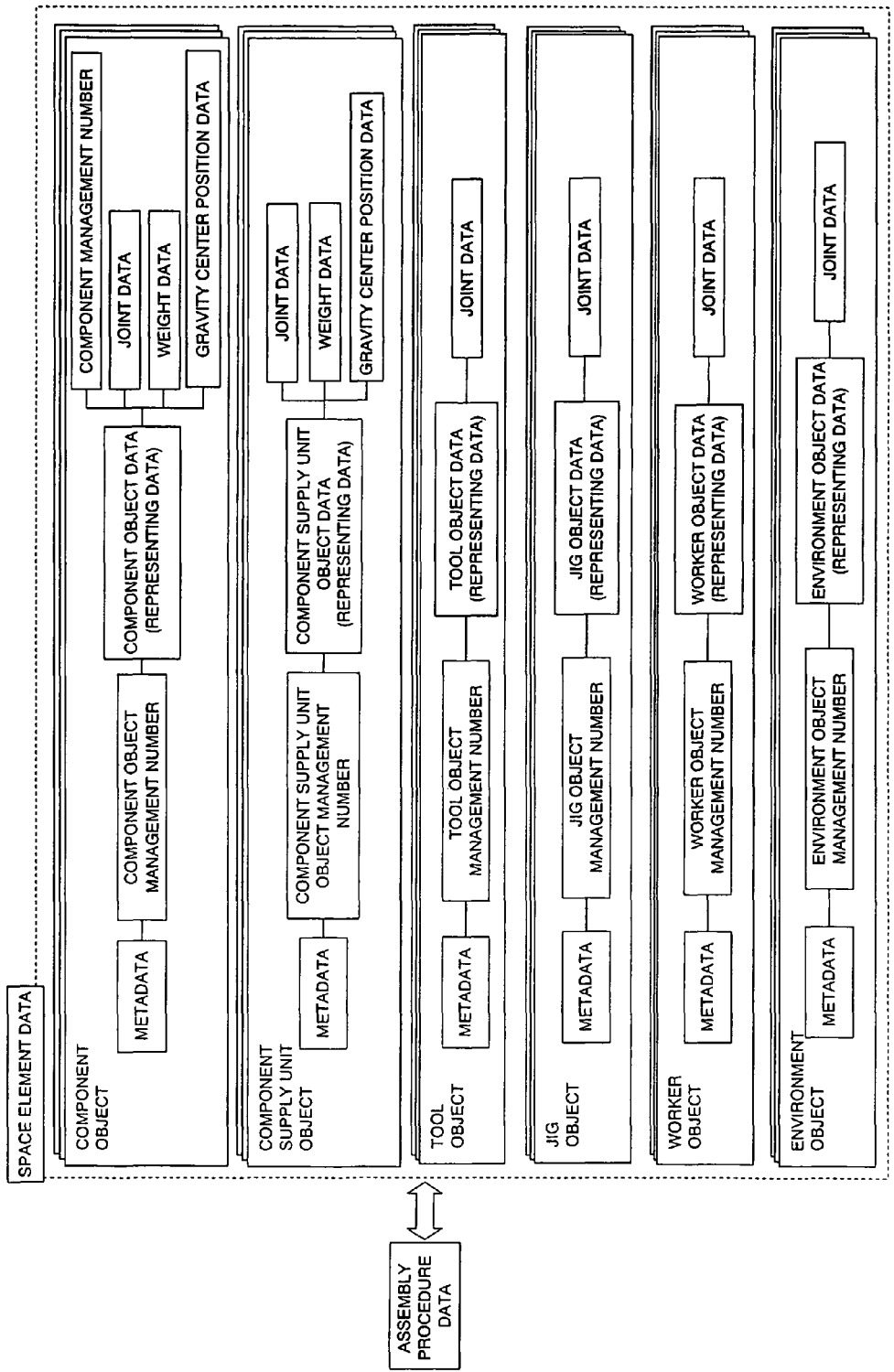
FIG. 4 is a view systematically showing assembly procedure data used in the production design support facility in the embodiment.

FIG. 3 and FIG. 4 show the structure of the data treated by the production design support device P systematically.

First, the assembly procedure data is explained. This assembly procedure data is the data composed of assembly data related to a combination of assembly enabled components and assembling order data related to an assembling order thereof.

More specifically, the assembly data is composed of the data described by associating the component object management numbers of assembly enabled components for showing the assembly enabled components, and the data described by associating the component supply unit object management numbers of component supply units and the component object management numbers of components that can be held by the component supply unit thereof for showing the combination of the component supply unit and the component that can be held by the component supply unit. Then, in the component object management numbers and the component supply unit object management numbers, work explanation information and the metadata are associated and described. Here, the work explanation information is the information explaining the work related to the element work or step, including not only the information that directly expresses the work but also the information that indirectly suggests the work. Text, "component A and component B are assembled." is given as an example of the former, and the text, "a bolt and a nut of M5 are assembled in the component A, but the length of the bolt and the outer diameter of the nut may be set at arbitrary dimension." is given as the latter.

Also, the assembling order data is composed of the data described by associating an element work name and the component object management number of the component already assembled in the element work, and the data described by associating a step name and the component object management number of the component already assembled in the step.

Next, the space element data is explained. The space element data is the data for representing an "object" as the object that can be present in the real space, and as shown in FIG. 4, is composed of component object data, component supply unit object data, tool object data, jig object data, and worker object data, and so forth in this embodiment.

More specifically, the component object data is representation data for displaying the component on the virtual space as a component object. Also, the component supply unit object data is the representation data for displaying the component supply unit as a component supply unit object in the virtual space. The tool object data is the data for representing a tool in the virtual space as a tool object. Here, the tool refers to the tool used in machining, such as a driver, a torque wrench, and an electric drill. Jig object data is the data for representing a jig as a jig object on the virtual space. Here, the jig refers to an auxiliary implement used for guiding the tool to a prescribed position during machining. The worker object data is the data for representing a worker as a worker object in the virtual space.

Then, the component object management number and the component supply unit object management number are given to the aforementioned component object data and component supply unit object data, respectively, thus making it possible to manage by each number. Note that this is not limited to number, but may be a sign or a mark, and a combination thereof, provided that they can thereby be identified. In addition, the same management number is also given to the tool object data, jig object data, and worker object data, and so forth, and the explanation is omitted.

Further, the component management number, joint data, weight data, and gravity center position data are associated with one another and described in the component object data.

The component management number adopts the component number given to the component. However, the present invention is not limited thereto, and is suitably set in accordance with the embodiment, such as adopting a figure number given to the figure for manufacturing the component.

The joint data is the data related to the joint capable of connecting other component object, the component supply unit object, and the virtual space. One or plural joints can be set for one component object in accordance with the embodiment. Also, the position at which the joint is set can be arbitrarily selected in accordance with the embodiment.

Figure 5:
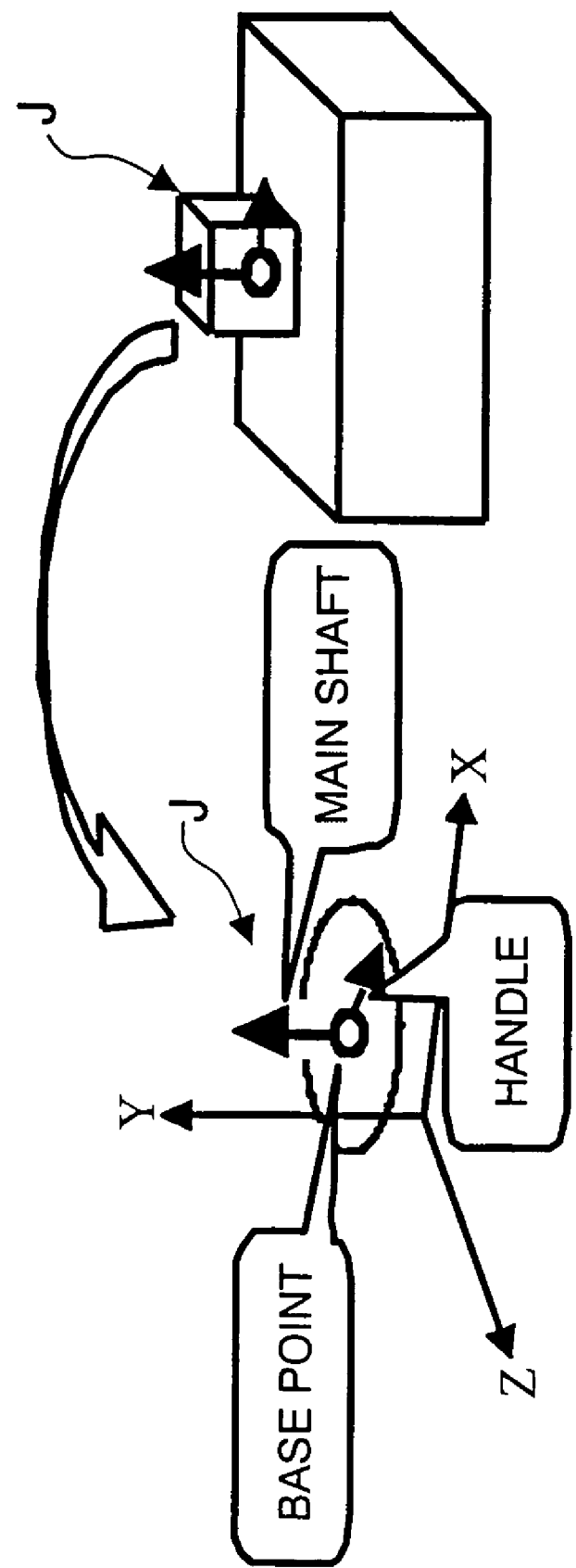
FIG. 5 is an explanatory view for explaining a joint in the embodiment.

Here, as schematically shown in FIG. 5, joint J is described as a set of a base-point coordinate, main axial vector component, and vector component in a handle direction, and can be described at various degree of freedom, by basically present/ absent of main axial vector and handle vector and an attribute definition thereof. Then, by defining the degree of freedom of objects one another, each object can be connected through the joint. For example, a bolt object (not shown) as the component object is connected by the joint (not shown) therebetween, so as to have a freedom movable only in a direction in which a nut object (not shown) as the component object is fastened and loosened.

In this embodiment, when one component object and other component object are connected in the virtual space, and when there is a plurality of joints in one component object, the component object is connected to the joint which is closest thereto in other component object. A connection method in this case is not limited to the aforementioned condition, and the component object may be connected to the joint by other condition such as being connected to a high-priority joint.

In addition, a plurality of component objects, which are already assembled in a prescribed manner, i.e. already connected by joints, are formed as a component object group that can be integrally treated, and the component object group may be moved in the virtual space.

Then, the object group and the object are connected, and each object group is connected, by specifying by drag & drop using a mouse, and by specifying by a mouse as the object group, or by selecting from a list.

The weight data is the data showing an actual weight of the component in the real space. As for the weight data, not the actual weight is shown but a virtual value can be given as the weight data.

The gravity center position data is the data showing a gravity position in the real space. As for the gravity center position data, as well as setting the data completely corresponding to the gravity center of an actual component as the gravity center position data, a virtual value can also be given as the gravity center position data.

To return to main discussion, each means will be described in detail.

The cooperation management means 10 performs cooperative management by associating the assembly procedure data stored in an assembly procedure data storage means D1 (see FIG. 10 and FIG. 11) and the space element data stored in a space element data storage means D2 (see FIG. 8 and FIG. 9) as corporative management data, to store them in the cooperation management data storage means 22 as will be described later. Note that in this embodiment, as shown in FIG. 6, the component supply unit object management number and the component object management number are used to associate the assembly procedure data and the space element data.

In addition, in this embodiment, as shown in FIG. 7, the component object management number and the component management number are associated, so that the component in the real space and the component object in the virtual space are cooperatively managed, and they are stored in the cooperation management data storage means 22, and thus they are cooperatively managed.

Figure 12:
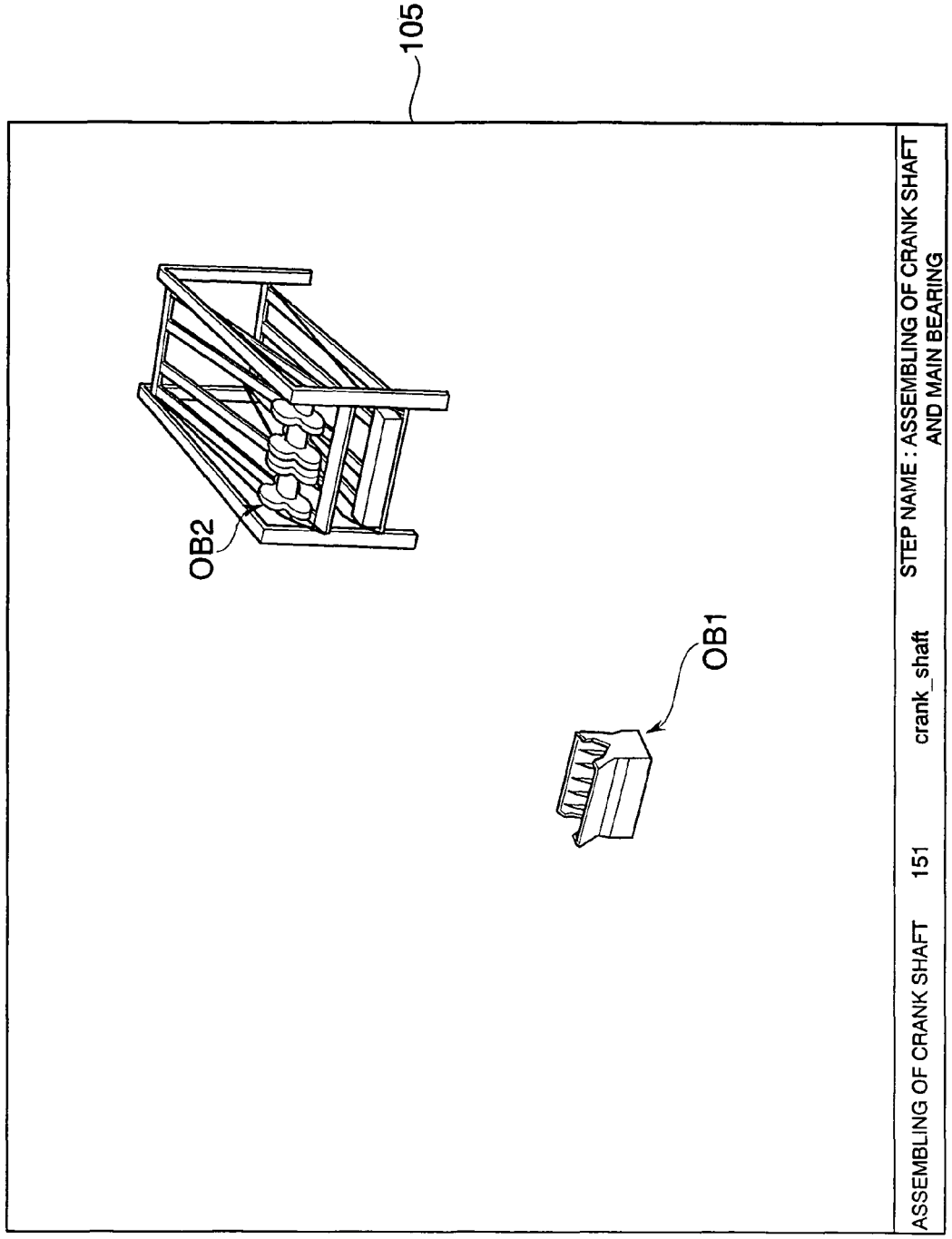
FIG. 12 is a view showing a display aspect of an object in the embodiment.
Figure 13:
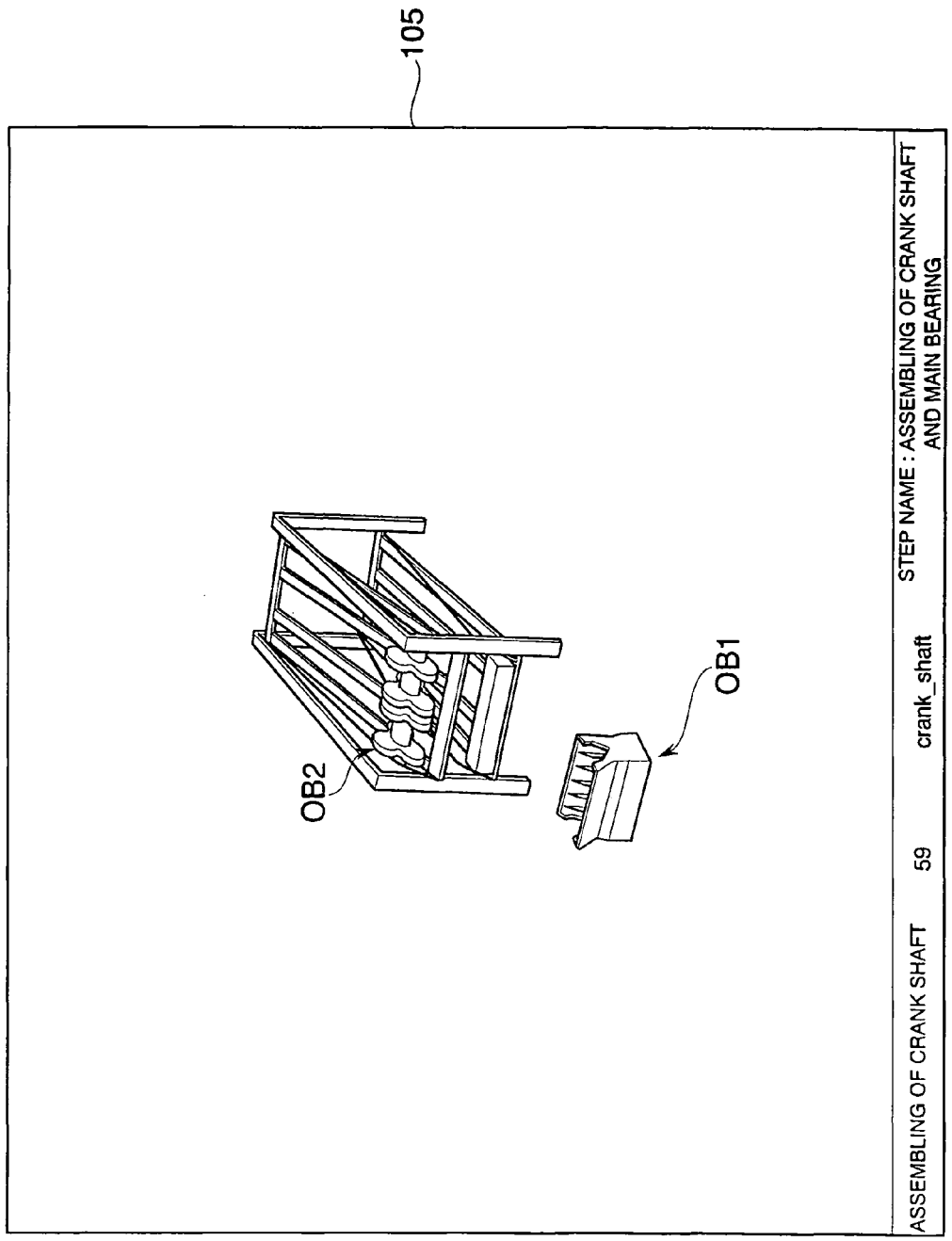
FIG. 13 is a view showing the display aspect of an object in the embodiment.
Figure 14:
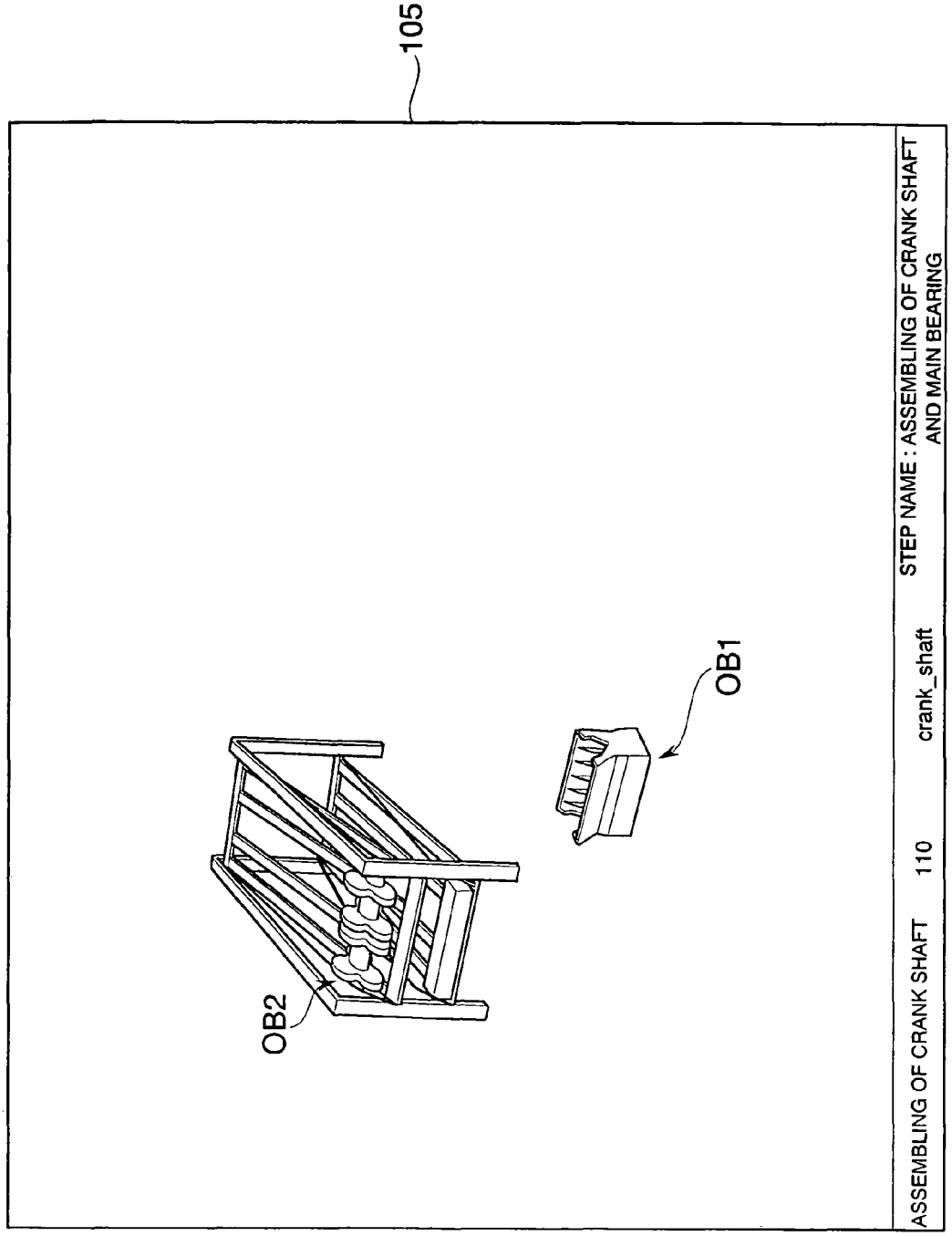
FIG. 14 is a view showing the display aspect of an object in the embodiment.

The object display means 11 displays the component and the component supply unit in the virtual space as the component object and the component supply unit object as shown in FIG. 12, FIG. 13, and FIG. 14, based on the component object data and the component supply unit object data stored in the space element data storage means D2, and is constituted by using the display means 105.

The coordinate data acquisition means 12 acquires coordinate data of the object displayed in the virtual space by the object display means 11. Note that in this embodiment, the coordinate data thus acquired is the data described in a world coordinate system in the virtual space. However, a method of expressing the coordinate data may be appropriately determined in accordance with the embodiment, such as using the data described in a local coordinate system, for example.

The element working time output means 13 outputs the element working time required for the assembly of the components, based on each coordinate data of one component object and the other component objects acquired by the coordinate data acquisition means 12, and the assembly procedure data related to the aforementioned component objects and cooperatively managed by the cooperation means. Note that in this embodiment, the element working time output means 13 outputs the element working time with reference to the data stored in the distance corresponding element working time data storage means 25.

When the element working time output means 13 outputs the element working time, it is possible to consider the embodiment such as outputting the element working time by dividing it into a man element working time showing the working time by a worker and a machine element working time showing the working time by a machine. However, in this case, it is requested to previously store the man element working time and the machine element working time in the distance corresponding element working time data storage means 25 as will be described later.

The assembly enabled relation determination means 14 determines whether or not one component and the other components related to the component object displayed in the virtual space are in the assembly enabled state, based on the assembly procedure data managed by the cooperation management means 10.

In this embodiment, as the method of determining whether or not the aforementioned component objects are in the assembly enabled state, (a) the method of determining it based on the assembling order is at least adopted, and in addition, (b) the method of determining it based on a combination of components is adopted as needed.

Specifically, (a) the method of determining it based on the assembling order is the method of determining whether or not a certain component and a certain component are in the assembly enabled state, and when there is no discrepancy between the component object management number of these components and the combination of the component object management number, in the order of element work names or the order of steps, it is determined to be assembly enabled. When there is a discrepancy therebetween, it is determined not to be able to assemble.

As an example, with reference to FIG. 10, an explanation will be given to the method of determining whether or not component object management number A005 is in the assembly enabled relation with component object management numbers A001 to A004. The component object management number A005 is determined to be in the assembly enabled relation with the component object management numbers A001 to A004, because the component object management number A005 is added to element work names P3 through P4. Meanwhile, the component object management number A005 is not added to any element work name P1 to P2, P2 to P3, and P3 to P4. Therefore, the component object management number A005 is determined to be not in the assembly enabled relation with the components related to the element work names P1 through P3.

Specifically, the assembly enabled relation determination means 14 can be defined as means for determining whether or not one component and the other components related to the component object displayed in the virtual space have assembly enabled relation, by calculating the change (such as a change from the element work names P1 to P2) from the previous state in the element work and determining whether or not an instruction (such as an instruction to assemble the component object management number A005 into A001 to A004) intended to be given in the next element work is established in this element work.

(b) The method of determining the assembly enabled relation is the method of determining whether or not a certain component and a certain component have the assembly enabled relation. Specifically, the component is determined to be able to assemble when the component object management number of the component is stored in the cooperation management data storage means 22 as will be described later as the component object management number of the component already assembled in the element work or step under the element work name or step name, and the component is determined not to be able to assemble when one of or both of the element work name and the step name are not stored therein.

As an example, with reference to FIG. 11, the explanation will be given to the method of determining whether or not the component object management number A005 is in the assembly enabled relation with the component object management numbers A001 and B001. This component object management number A005 is stored correspondingly to the component object management number A001 under the element work name P4, and is therefore determined to be in the assembly enabled relation with the component related to the component object management number A001, and meanwhile is determined to be in the relation not to be able to assemble with the component related to the component object management number B001 in the combination of components, because the component object management number B001 is not stored correspondingly to the component object management number A005 under any element work name.

As to steps also, the assembly enabled relation determination means 14 determines the assembly enabled relation based on a storage mode shown in FIG. 11. However, this method of determination is the same as a case of determination for the element work, and therefore the explanation is omitted.

In addition, when the assembly enabled relation determination means 14 determines that the components are in the assembly enabled relation, the element working time output means 13 outputs the element working time required for the assembly of the components, based on each coordinate data of one component object and the other component objects acquired by the coordinate data acquisition means 12.

When the assembly enabled relation determination means 14 determines the relation not to be able to assemble in the combination of the components in the assembly procedure data, a first report means 15 reports accordingly.

In this embodiment, the information is reported by displaying on screen by the first report means 15, in such a way that not only the information showing the relation not to be able to assemble, but also the information suggesting the combination of assembly enabled components is displayed on screen. However, the information may also be reported in such a way that the information suggesting the combination of the assembly enabled component is replaced with the information showing the relation to be able to assemble.

When the assembly enabled relation determination means 14 determines the relation not to be able to assemble in the assembling order in the assembly procedure data, a second report means 16 reports accordingly.

In this embodiment, the information is reported by displaying on screen by the second report means 16, in such a way that not only the information showing the relation not to be able to assemble, but also the information suggesting an assembly enabled assembly procedure is displayed on screen. However, the information may also be reported in such a way that the information suggesting the assembly enabled assembly procedure is replaced with the information showing the relation not to be able to assemble.

The object moving instruction reception means 17 receives the instruction to move the component object and the component supply unit object displayed in the virtual space, to the arbitrary position in the virtual space as an object moving instruction, wherein the aforementioned input interface 104, or the like is used.

As a specific instruction received by the object moving instruction reception means 17, an example is given such as the instruction to indicate the object displayed in the screen by a mouse and drag and drop it to a desired position.

Note that it goes without saying that the object display means 11 displays the object, following an object moving instruction received by the object moving instruction reception means 17.

The assembly procedure data reception means 18 is provided for receiving the assembly procedure data related to the prescribed product or the assembly procedure data related to other product different from the prescribed product, wherein the aforementioned communication interface 106 is used. Note that instead of using the communication interface 106, for example, the data recorded in a recording medium such as a CD-ROM may also be received.

The assembly procedure data edit instruction reception means 19 receives the instruction to edit at least either one of the data of the combination or assembling order of the components in the assembly procedure data, wherein the aforementioned input interface 104, etc, is used.

More specifically, for example, the instruction to delete the component object management number A001 of the element work name P1 or change it to the other component object management number is given as an example. At this time, a changeable component object management number may be displayed by pull down menu or the like.

The reproductivity calculation display means 20 calculates and displays a reproductivity based on the character string of the search source and the character string of the search destination. Although in this embodiment, the metadata is used in the character string of the search source and the character string of the search destination, the present invention is not limited thereto, and for example, the component management number and the component object management number may be used, or work explanation information may be used. The reproductivity calculation display means 20 displays the reproductivity to be calculated in descending order from a larger value. However, it can be displayed by an appropriate method such as displaying in ascending order or displaying only a prescribed value or more.

The reproductivity will be more specifically explained. The reproductivity is an index value for selecting the value closer to the character string of the search source from a plurality of search destinations, which is defined by reproductivity=$\Sigma$ (the number of appearance of characters constituting the character string in the search destination)/ (the number of appearance of characters constituting the character string in the search source). Note that in this embodiment, alphabet is adopted in the character for obtaining the reproductivity. Accordingly, a sum total of reproductivity of A, reproductivity of B, . . . reproductivity of Z becomes the reproductivity. Also, the character for obtaining the reproductivity is not limited to alphabet, but may include numeric characters, signs and marks, Chinese characters, Japanese characters, and Katakana. Further, a graphic such as a mark may also be included.

An example will be given for explanation. For example, it is assumed that there is one search source and its character string is "BRAKELAMP", and there are three search destinations and their character strings are "BRK", "BRKLMP", and "BRKPAD".

First, as to the search source "BRAKELAMP", what character appears is obtained. Then, it is found that B, R, K, E, L, M, and P appear once, respectively, and A appears twice. Therefore, A=2, B=1, E=1, K=1, L=1, M=1, P=1, and R=1 are obtained.

Next, as to the search destination "BRK", an appearance of the character is obtained. Then, it is found that the character A does not appear, and therefore 0/2=0 is obtained as the reproductivity related to A. Similarly, 1/1=1 is obtained as the reproductivity related to B, 0/1=0 is obtained as the reproductivity related to E, 1/1=1 is obtained as the reproductivity related to K, 0/1=0 is obtained as the reproductivity related to L, 0/1=0 is obtained as the reproductivity related to M, 0/1=0 is obtained as the reproductivity related to P, and 1/1=1 is obtained as the reproductivity related to R. Accordingly, the sum total thereof becomes 0+1+0+1+0+0+0+1=3, and 3 is obtained as the reproductivity of the search destination "BRK".

Similarly, 6 is obtained as the reproductivity of the search destination "BRKLMP", and 4.5 is obtained as the reproductivity of the search destination "BRKPAD".

Note that the method of calculating the reproductivity is not limited thereto.

The fitness determination result reception means 21 receives as a determination result the search source and the search destination to be cooperated, which are determined to be in a fitness relation by a user, based on the reproductivity displayed by the reproductivity calculation display means 20, wherein the aforementioned input interface 104 or the like is used.

The cooperation management data storage means 22 stores the assembly procedure data and space element data cooperatively managed by the cooperation management means 10, as cooperatively management data in a state of being cooperatively managed, and is formed in at least one prescribed region of the internal memory 102 and the external storage device 103.

The graphic element work display means 23 displays on screen the element working time outputted by the element working time output means 13, as a graphic element work called "stacker" that graphically displays the element working time correspondingly to its length, wherein the aforementioned display means 105 is used.

Figure 15:
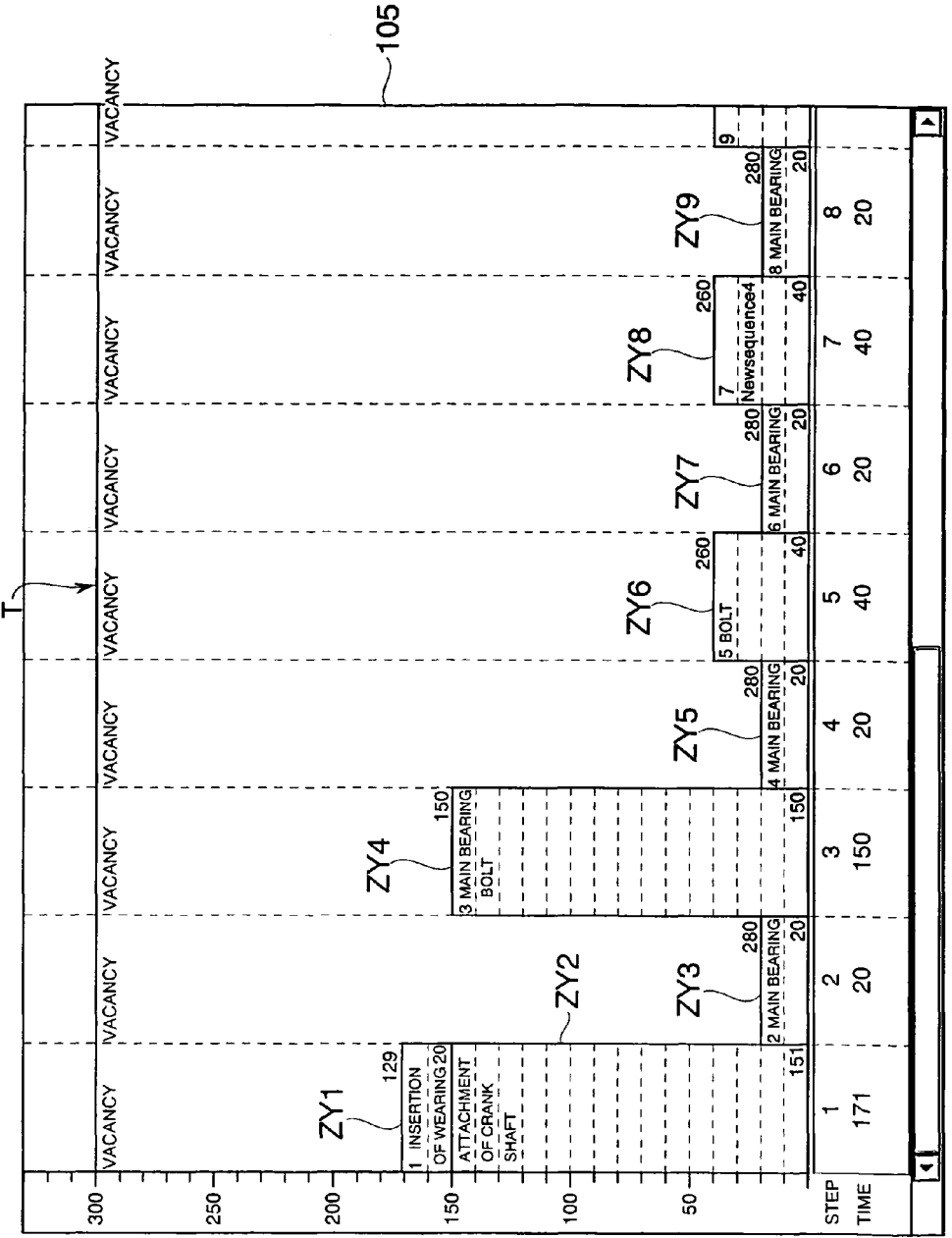
FIG. 15 is a view showing the display aspect of graphic element working time in the embodiment.
Figure 16:
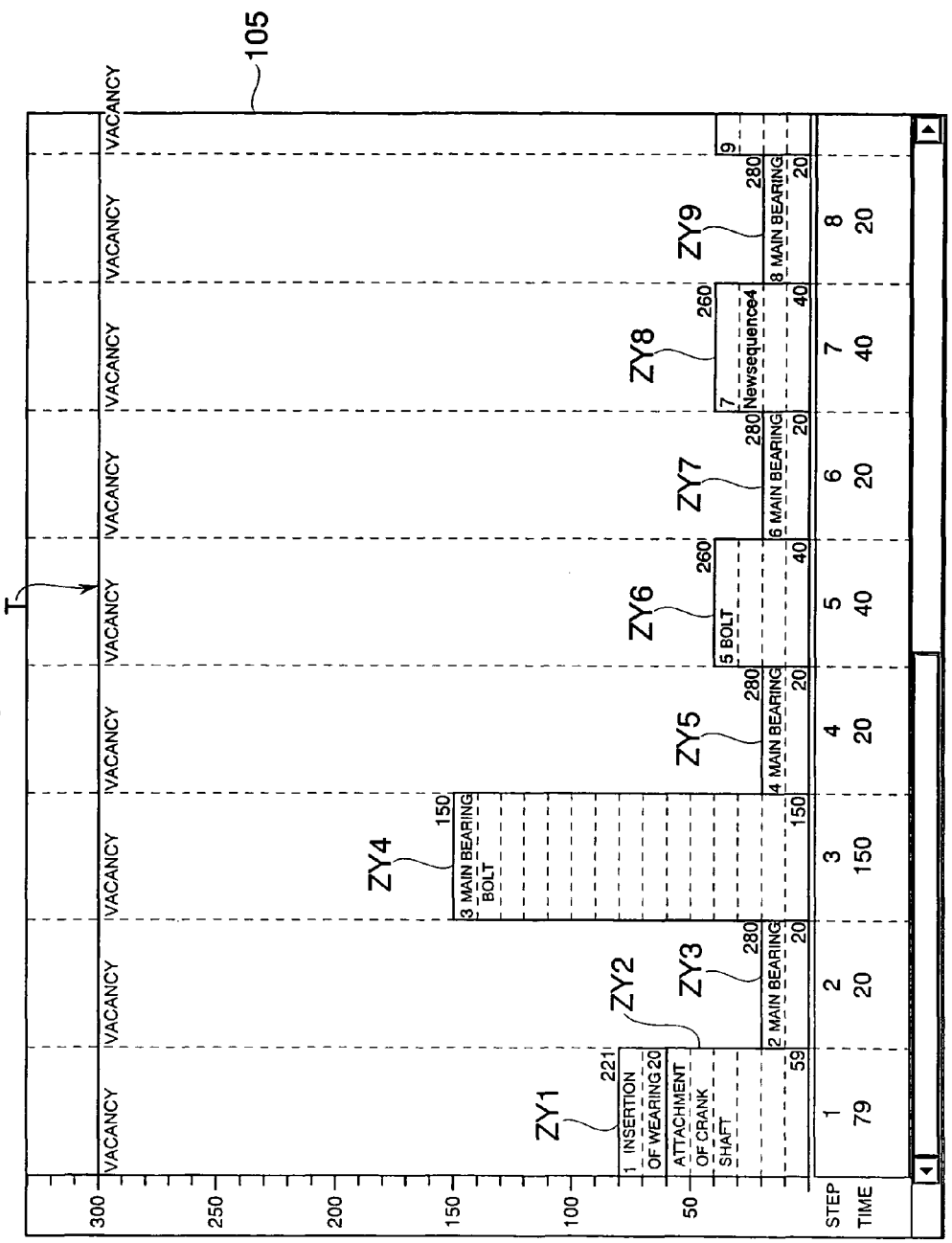
FIG. 16 is a view showing the display aspect of graphic element working time in the embodiment.
Figure 17:
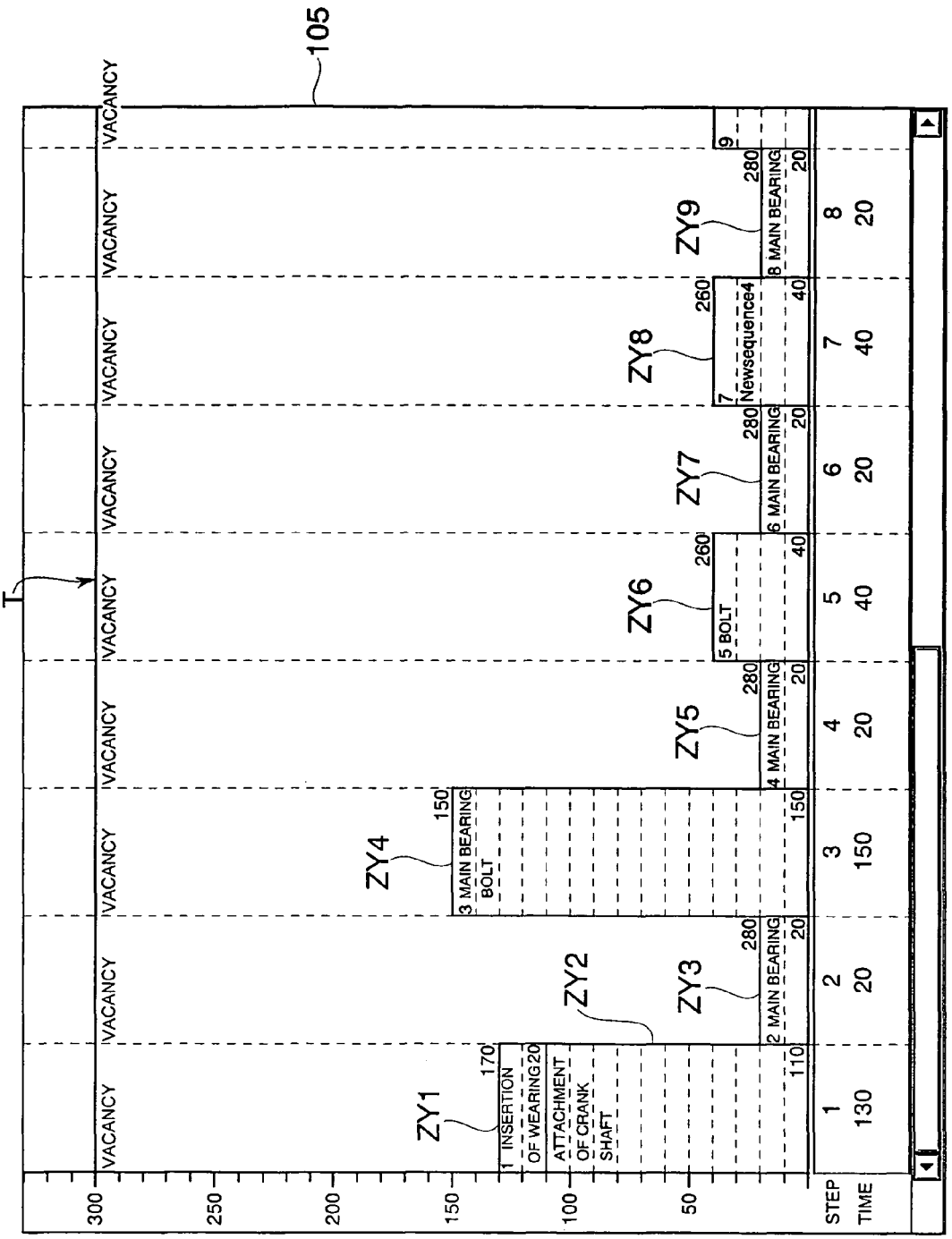
FIG. 17 is a view showing the display aspect of graphic element working time in the embodiment.

More specifically, as shown in FIG. 15, FIG. 16, and FIG. 17, in the graphic element work ZY (ZY1, ZY2, . . . ), two-dimensional bar graph formed correspondingly to the length of the element working time is adopted. Namely, small and large of the element working time can be shown by the length of the bar of the bar graph. Note that this bar graph is not limited to the two-dimensional graph, but may be three-dimensional graph or changed in a manner of an animated cartoon. Further, in the graphic element work not only the bar graph, but also other graph may be adopted, provided that the small and large of the element working time can be shown.

In addition, in this embodiment, there exist a plurality of steps for producing the product. Therefore, the graphic element work display means 23 displays on screen the graphic element work for each step in an order of a work.

The graphic element work display change instruction reception means 24 receives a display change instruction related to the change of the display such as addition, deletion, and rearrangement of the graphic element work, wherein the aforementioned input interface 104, etc, is used.

As a specific instruction received by the graphic element work display change instruction reception means 24, an example is given such as the instruction to indicate the graphic element work showing on the screen by a mouse and to drag and drop it to a desired position.

Then, when the display change instruction is received by the graphic element work display change instruction reception means 24, the graphic element work display means 23 displays the graphic element work, following the display change instruction received by the graphic element work display change instruction reception means 24.

In this embodiment, when the display change instruction is received, the graphic element work display change instruction reception means 24 determines whether or not the component object related to the graphic element work received by the graphic element work display change reception means 24 is in the assembly enabled state, with reference to the cooperation management means 10.

Then, when the assembly enabled relation determination means 14 determines that the component object related to the graphic element work received by the graphic element work display change instruction reception means 24 can be in the assembly enabled state, the element work output means outputs the element working time corresponding to the component object related to the graphic element work received by the graphic element work display change instruction reception means 24.

The distance corresponding element working time data storage means 25 arranges the element working time and the separation distance in a set and stores a plurality of sets, and is formed in at least one prescribed region of the internal memory 102 and the external storage device 103.

Then, the element working time output means 13 determines and outputs the element working time corresponding to the separation distance, with reference to the distance corresponding element working time data storage means 25.

Note that the method of outputting the element working time is not limited thereto. For example, when the element working time is changed linearly or non-linearly in accordance with the separation distance between components, the element working time output means 13 can also calculate and output the element working time at substantially real time, from the separation distance between component equipment objects in the virtual space.

The worker characteristic data storage means 26 stores worker characteristic data obtained by converting worker characteristics of the individual worker related to the element working time into data, and is formed in one prescribed region of the internal memory 102 and the external storage device 103.

Here, as the worker characteristic data, for example, the data is obtained by converting a proficiency degree of a prescribed work into a numeric value. In addition, actually measured element working time is classified by a category such as gender, muscle force, physical frame, and area, and is previously prepared as a database, and an actually measured value thereof may be utilized as the characteristic of the worker.

Then, the element working time output means 13 outputs the element working time that reflects an individual characteristic of the worker, by using the worker characteristic data stored in the worker characteristic data storage means 26.

For example, when the proficiency of a skilled worker, which is the worker characteristic data, is set at 100, and the proficiency of an unskilled worker, which is the worker characteristic data, is set at 100 or less in accordance with the proficiency of the unskilled worker, and the element working time is divided by the value thus obtained, the element working time that reflects the characteristic of the worker can be outputted. Here, the method of setting the proficiency includes not only the method of receiving the proficiency via the input interface 104, etc, but also the method of receiving the data for determining the proficiency via the input interface 104, etc, and subjecting the data thus obtained to calculation processing appropriately, to obtain the proficiency.

The tact time display means 27 displays on screen the tact time related to the product, wherein the aforementioned display means 105, etc, is used.

The tact time parameter reception means 28 receives a tact time parameter for setting the tact time, wherein the input interface 104, etc, is used. Here, the number of production per unit prescribed period and production estimated time in the prescribed period can be given as the tact time parameter.

The tact time calculating means 29 calculates the tact time based on the tact time parameter received by the tact time parameter reception means 28. Specifically, the value obtained by dividing the production estimated time by the number of production is set as the tact time.

Then, the tact time display means 27 displays on screen the tact time calculated by the tact time calculator 29 in a mode as shown in FIG. 15, FIG. 16, and FIG. 17, for example.

The step display means 30 models and displays the steps on screen, wherein the aforementioned display means 105, etc, is used.

As a modeled step, for example, an overall step names are displayed in a list, but the present invention is not limited thereto.

The step display change instruction reception means 31 receives a display change instruction related to the change of the display such as addition, deletion, and rearrangement of modeled steps, wherein the aforementioned input interface 104, etc, is used.

In this embodiment, when the step display change instruction reception means 31 receives the display change instruction related to the change of the display such as addition, deletion, and rearrangement of the modeled steps, the assembly enabled relation determination means 14 determines whether or not the component object related to the step received by the step display change instruction reception means 31 is in the assembly enabled state, with reference to the cooperation management means 10.

Then, when the assembly enabled relation determination means 14 determines that the component object related to the step received by the step display change instruction reception means 31 is in the assembly enabled state, the element work output means outputs the element working time corresponding to the component object related to the step received by the step display change instruction reception means 31.

The total weight calculating means 32 calculates total weight data based on the weight data.

In this embodiment, in the cooperation management means 10, a total weight of one or a plurality of components related to one or a plurality of component objects that can be held in the component supply unit object is calculated.

The arrangement balance state data calculating means 33 calculates an arrangement balance state of the component held by the component supply unit as arrangement balance state data, from the gravity center position data and the weight data of the component object or the total weight data calculated by the total weight calculating means 32 and the gravity center position data of the component supply unit object.

Then, the arrangement balance state data calculating means 33 calculates the arrangement balance state data, for each work shown by the assembling order of the assembly procedure data managed by the cooperation management means 10.

Based on the arrangement balance state data calculated by the arrangement balance state data calculating means 33, the workability information output means 34 outputs workability information related to the workability of the worker, wherein the aforementioned display means 105, etc, is used to output on screen the workability information in this embodiment.

In this embodiment, when it is estimated that the arrangement balance state has an adverse affect on the work, the workability information outputted by the workability information output means 34 displays on screen warning information showing accordingly. Here, as the method of estimating that the arrangement balance state has the adverse affect on the work, there is the method in which a moment related to the component presently held by a pallet is obtained and is displayed three-dimensionally at a gravity position of the pallet for carrying an article group, from the gravity center of the pallet for carrying the article group and the gravity center position of the component presently held by the pallet and the total weight thereof, and when this moment is beyond a prescribed threshold value, the arrangement balance state has the adverse affect on the work.

In addition, the workability information outputted by the workability information output means 34 can be the component object exchange information related to the exchange of the component object required for improving the arrangement balance. As a specific component object exchange information, the component number is given as an example, but the present invention is not limited thereto. Further, this component object exchange information may be outputted with the aforementioned warning information, or may be outputted replacing the warning information.

Next, an operation of the production design support device P of this embodiment will be explained by using a flowchart.

Note that for convenience of the explanation, the explanation is given by dividing flowchart into (1) to (6). These flowcharts can be processed independently or in parallel in accordance with the embodiment.

The flowchart which is related to the cooperation of the assembly procedure data and the space element data.

Figure 19:
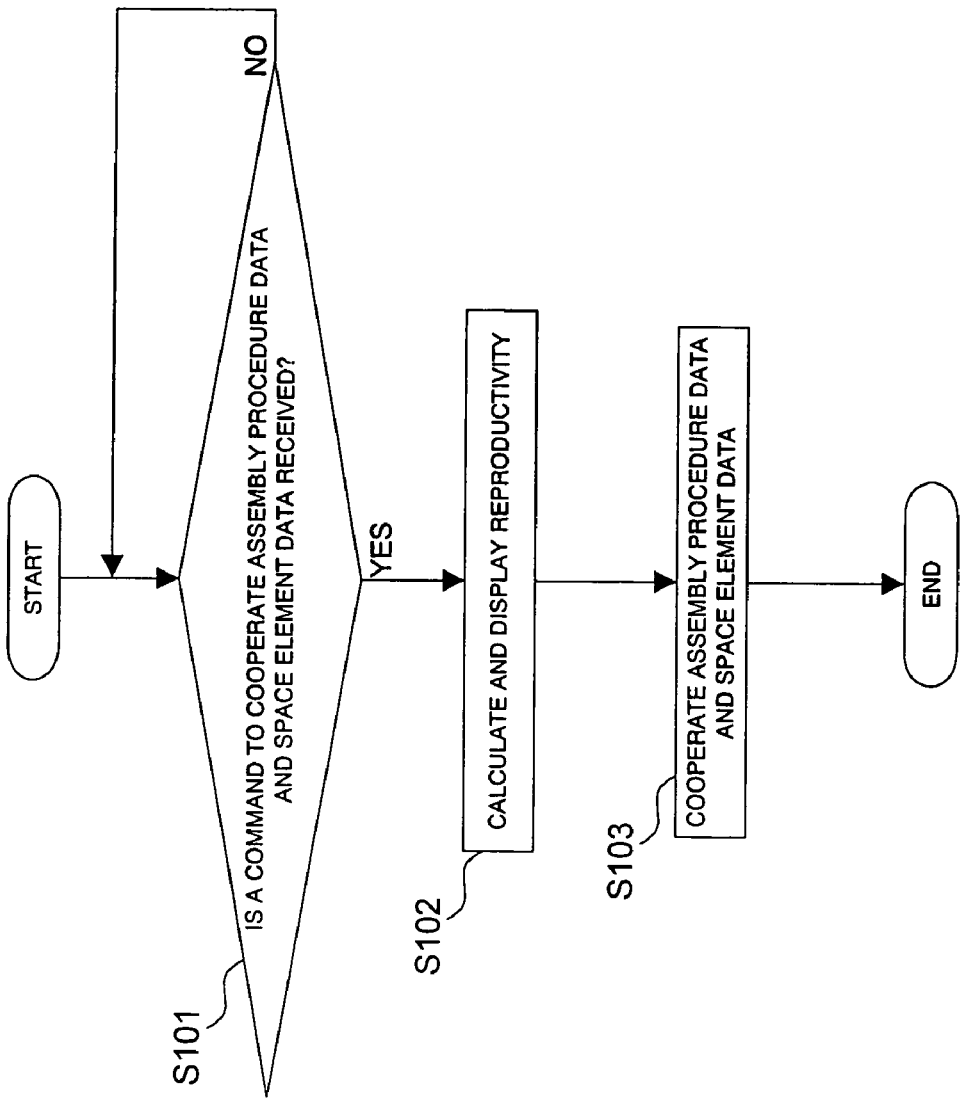
FIG. 19 is a flowchart showing an operation of the production design support facility in the embodiment.

As shown in FIG. 19, when a command to cooperate the assembly procedure data and the space element data is received via the input interface 104, etc, (step S101), the reproductivity calculation display means 20 calculates the reproductivity and sort it into a prescribed order and display it, with reference to the metadata related to the space element data stored in the space element data storage means D2 and the metadata related to the assembly procedure data stored in the assembly procedure data storage means D1 (step S102). Then, based on a determination result received by the fitness determination result reception means 21, the cooperation management means 10 stores the aforementioned metadata in the cooperation management data storage means 22 by associating them with one another. (step S103).

Note that the assembly procedure data used in calculation is not limited to the data stored in the assembly procedure data storage means D1, and for example, the assembly procedure data received by the assembly procedure data reception means 18 may be adopted.

The flowchart which is related to the output of the element working time and the display of the graphic element work.

Figure 20:
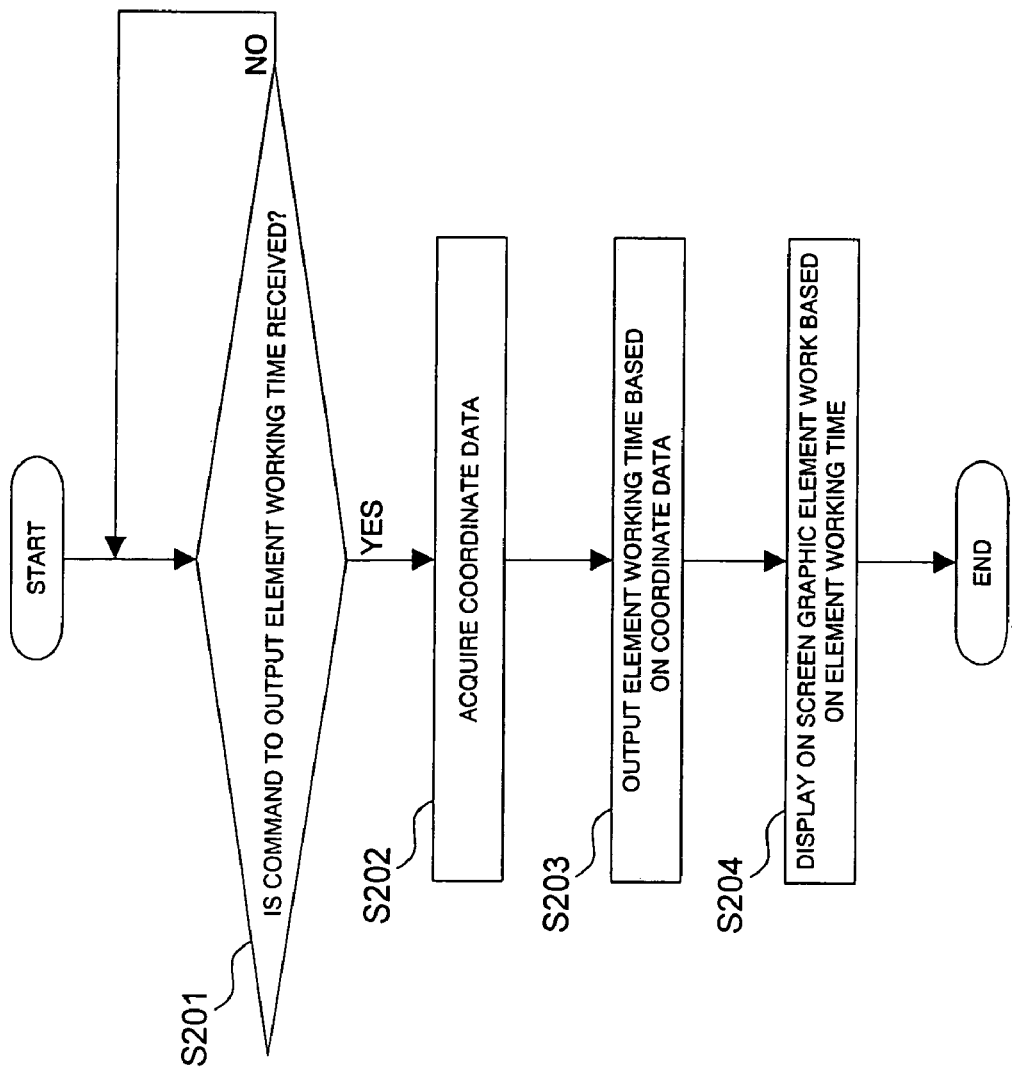
FIG. 20 is a flowchart showing the operation of the production design support facility in the embodiment.

As shown in FIG. 20, when the command to output the element working time is received via the input interface 104, etc, (step S201), the coordinate data acquisition means 12 acquires the coordinate data of the object displayed on screen by the object display means 11 (step S202). Then, based on the coordinate data, the element working time output means 13 outputs the element working time related to the object (step S203) Note that in this embodiment, in the step S203, by appropriately referring to the data stored in the distance corresponding element working time data storage means 25 and in the worker characteristic data storage means 26, the element working time is outputted. Thus, the graphic element work display means 23 displays on screen the element working time outputted by the element working time output means 13 as a graphic element work (step S204).

In addition, in this embodiment, when the step display means 30 displays on screen the step and the tact time display means 27 displays the tact time, for example, this is performed simultaneously with the processing of the step S204, but the timing of the processing is not limited thereto.

Further, when the command to output the element working time is received by using the input interface 104, etc, the element working time is outputted. However, as shown in the case of (3) as will be described later, the element working time can be automatically outputted at an appropriate timing, like outputting the element working time when there is a change in the displayed on screen object.

The flowchart which is related to the movement of the displayed on screen object and the output of the element working time.

Figure 21:
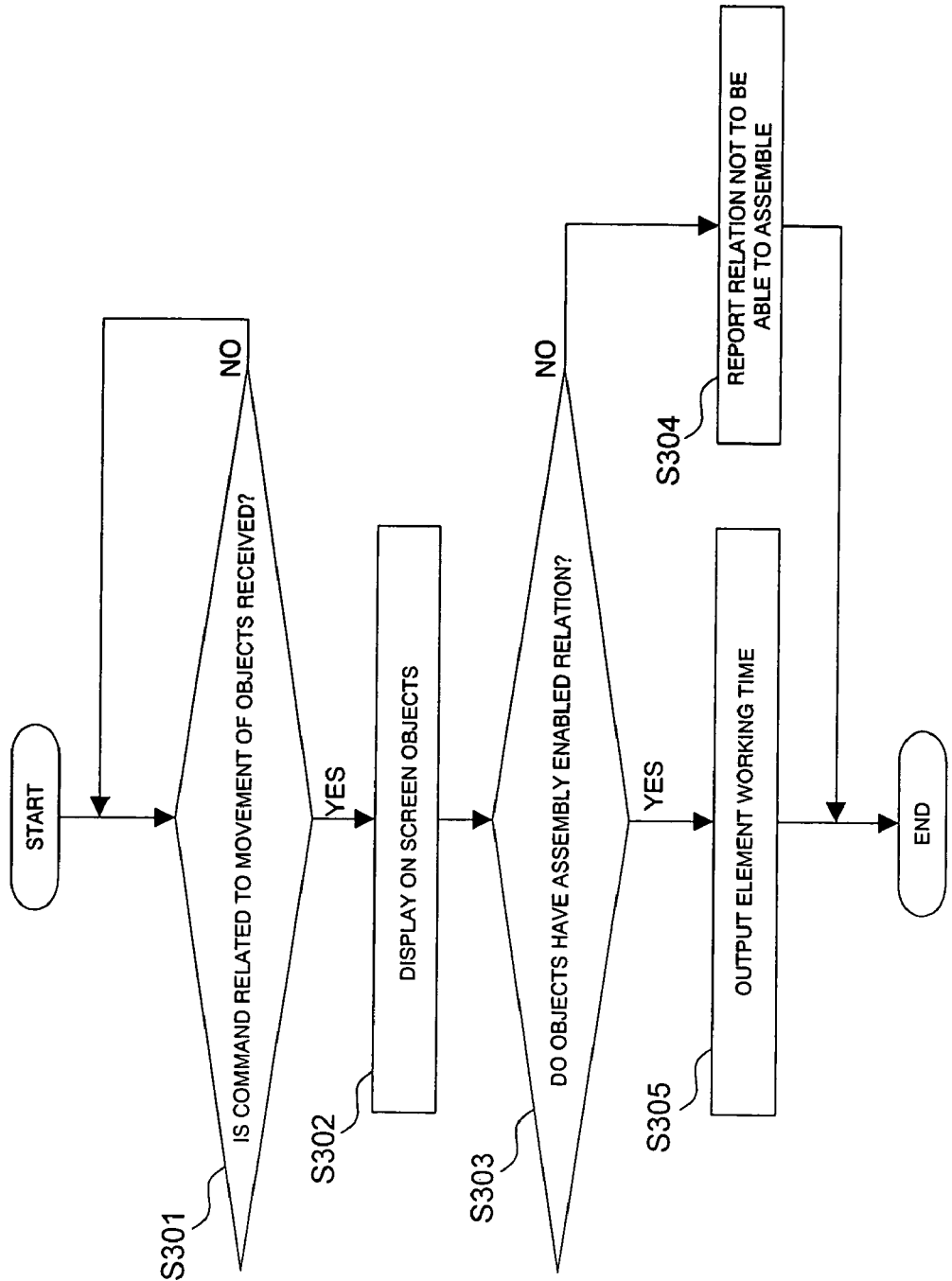
FIG. 21 is a flowchart showing the operation of the production design support facility in the embodiment.

As shown in FIG. 21, when the object moving instruction reception means 17 receives the instruction related to the movement of the displayed on screen object (step S301), first, the object display means 11 displays on screen the object at a place based on the instruction (step S302). Then, the assembly enabled relation determination means 14 determines whether or not the other object present at a displayed place and the object thus displayed have assembly enabled relation, and when the above objects are determined to have not the assembly enabled relation (step S303), the first report means 15 or the second report means 16 reports that the above objects have not the assembly enabled relation (step S304). Meanwhile, when the above objects are determined to have the assembly enabled relation (step S303), the element working time output means 13 outputs the element working time related to the above objects (step S305).

The explanation will specifically be given to the flow related to the movement of the objects and the output of the element working time by using an output screen. There are provided a component object OB1 and a component supply unit object OB2 arranged at a position shown in FIG. 12. When the component object OB1 is set so as to be close to the component supply unit object OB2, for example, (see FIG.

13), the graphic element work, whereby the element working time before and after movement is integrated into graphics, is displayed as the change of a graphic element work ZY2 whereby "assembling of a crankshaft" is shown as shown in FIG. 15 and FIG. 16.

The flowchart which is related to the change of the graphic element work.

Figure 22:
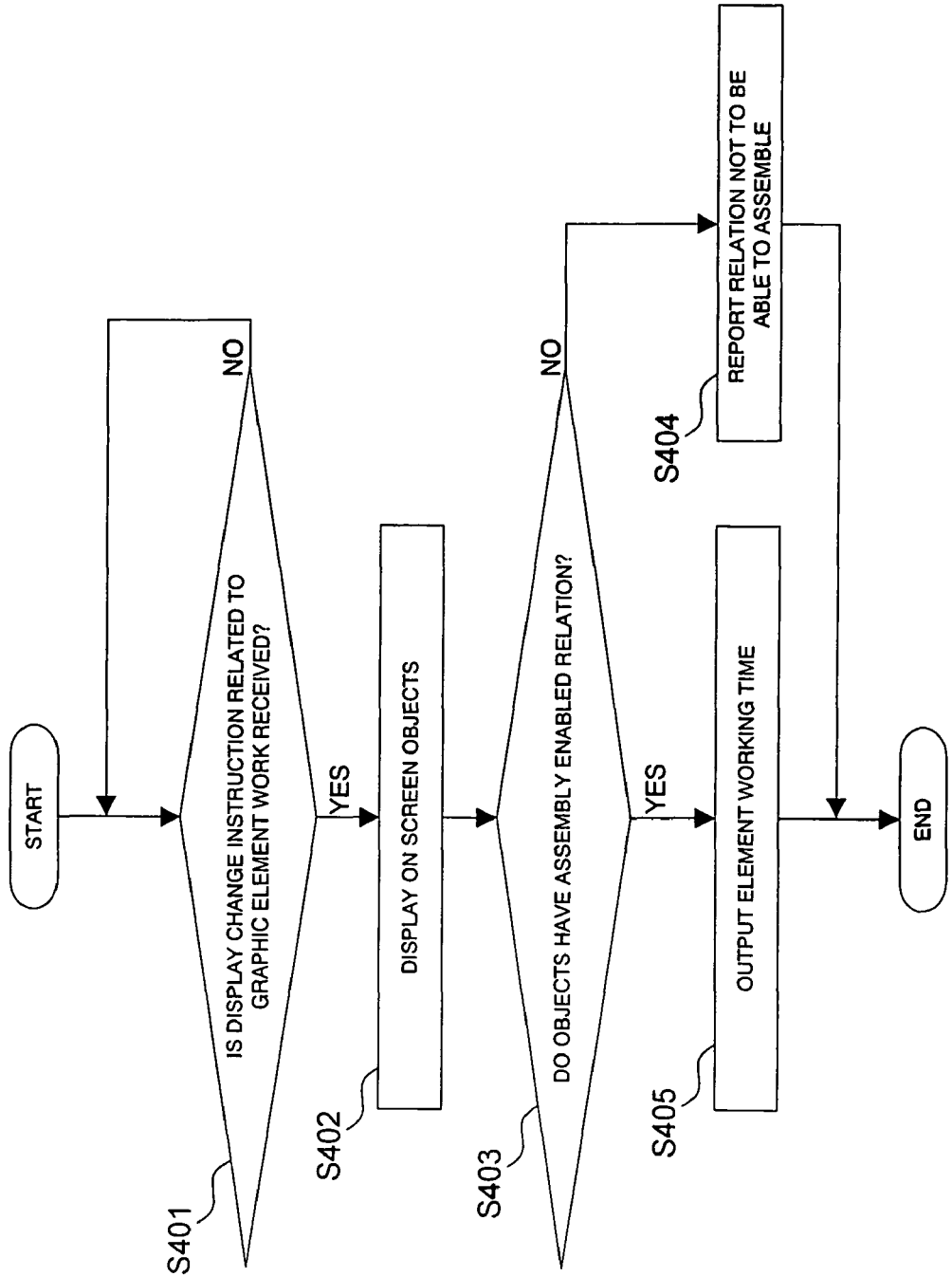
FIG. 22 is a flowchart showing the operation of the production design support facility in the embodiment.

As shown in FIG. 22, when the graphic element work display change instruction reception means 24 receives the display change instruction related to the graphic element work (step S401), the graphic element work display means 23 displays on screen the graphic element work following the display change instruction received by the graphic element work display change instruction reception means 24 (step S402). In addition, the assembly enabled relation determination means 14 determines whether or not the component object related to the graphic element work received by the graphic element work display change instruction reception means 24 is in the assembly enabled state, with reference to the cooperation management means 10. Then, when the assembly enabled relation determination means 14 determines that the component object related to the graphic element work received by the graphic element work display change instruction reception means 24 is in the assembly enabled state (step S403), the element work output means outputs the element working time corresponding to the component object related to the graphic element work received by the graphic element work display change instruction reception means 24 (step S404). Meanwhile, when the component object is determined to be in the state not to be able to assemble, the first report means 15 or the second report means 16 reports accordingly (step S405).

When the step display change instruction reception means 31 receives the display change instruction related to the step, the same processing is performed.

The flowchart which is related to the change of the display of the tact time.

Figure 23:
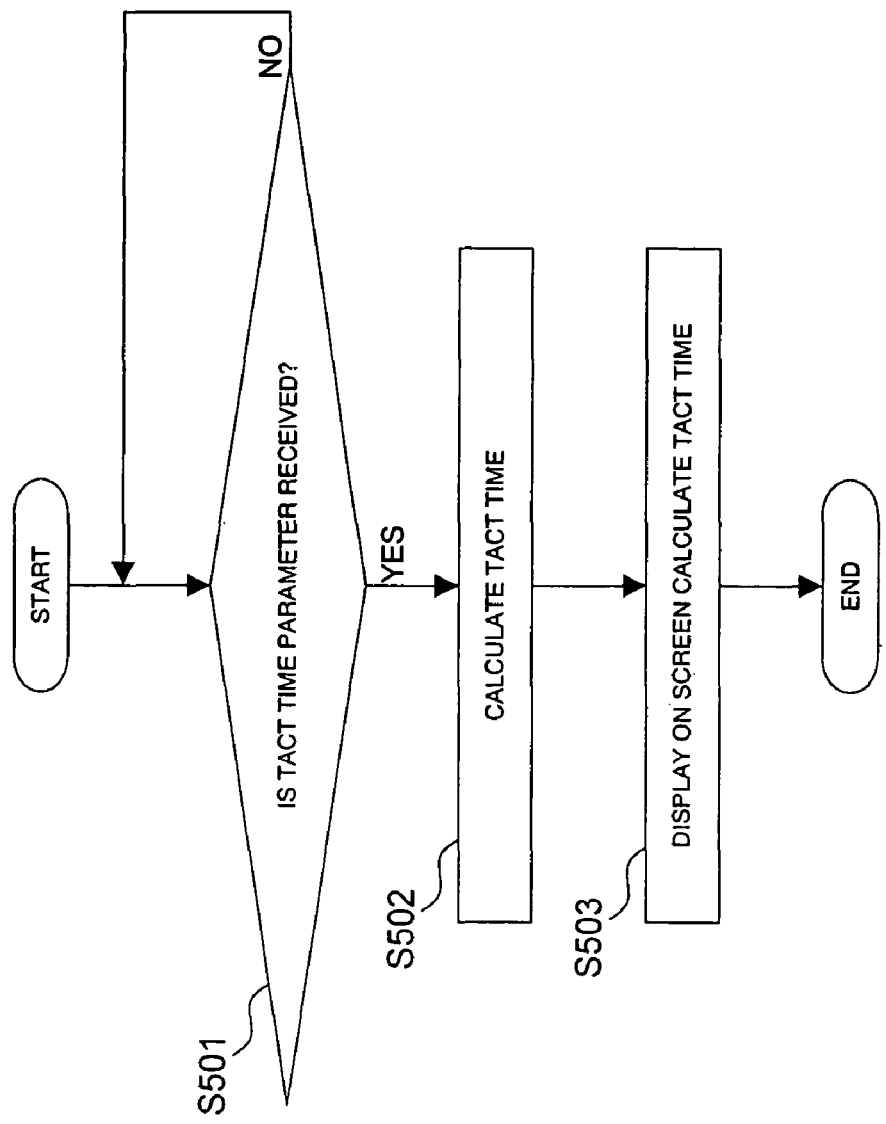
FIG. 23 is a flowchart showing the operation of the production design support facility in the embodiment.

As shown in FIG. 23, first, when the tact time parameter reception means 28 receives a tact time parameter (step S501), the tact time calculating means 29 calculates the tact time based on the parameter thus received (step S502). Then, the tact time display means 27 displays on screen the tact time thus calculated (step S503). In this embodiment, the tact time display means 27 displays the tact time in a manner shown in FIG. 15, etc. but the present invention is not limited thereto.

The flowchart which is related to the output of the workability information.

Figure 24:
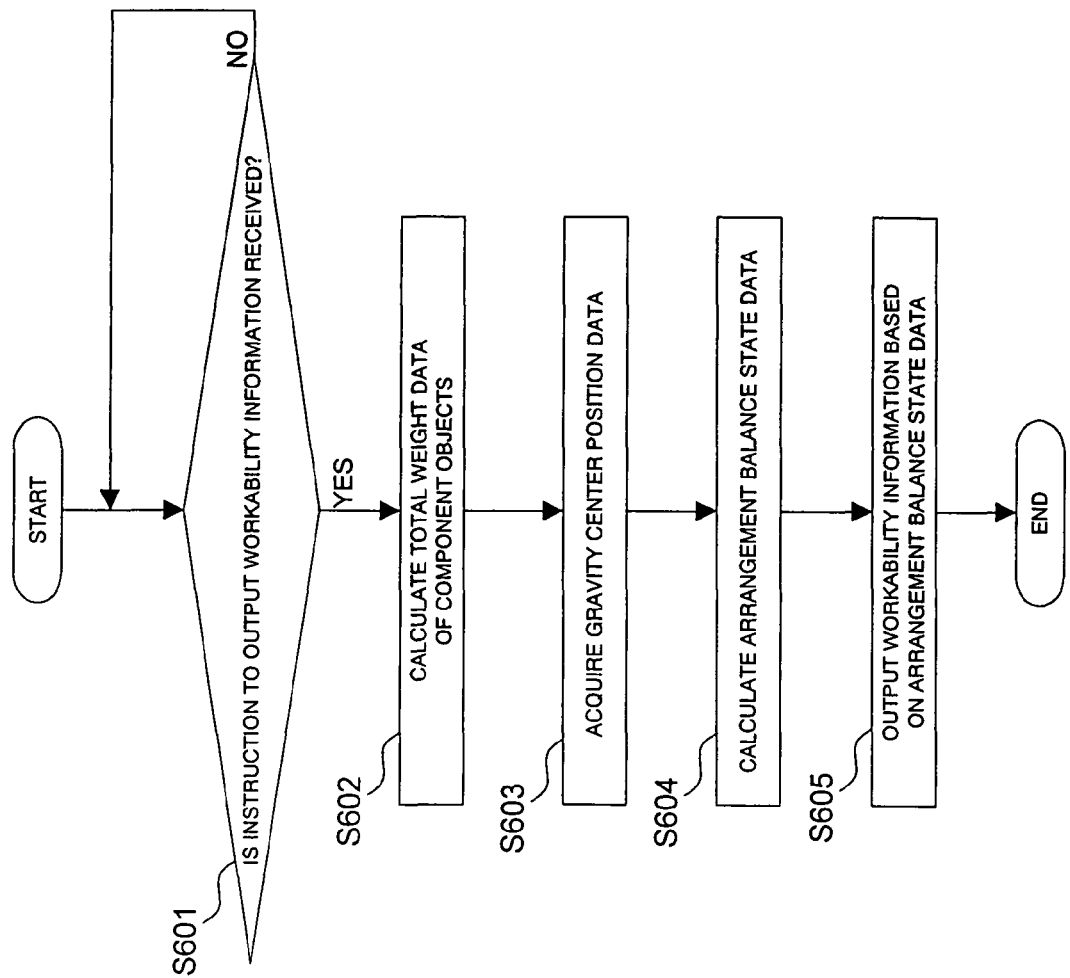
FIG. 24 is a flowchart showing the operation of the production design support facility in the embodiment.

As shown in FIG. 24, when the command to output the workability information via the input interface 104, etc, (step S601), the total weight calculating means 32 calculates the total weight data of the component object held by the component supply unit object that receives designation (step S602). In addition, the coordinate data acquisition means 12 acquires the component object that receives designation and the gravity center position data of the component supply unit object (step S603). Then, the arrangement balance state data calculating means 33 calculates the arrangement balance state data based on the total weight data and the gravity center position data, and the workability information output means 34 outputs the workability information based on the arrangement balance position data thus calculated (step S605).

Note that when the command to output the workability information is received by using the input interface 104, etc, the workability information is outputted. However, the workability information may be automatically outputted at an appropriate timing.

Thus, the production design support device P according to this embodiment is capable of effectively performing the production design by effectively linking the study on the overall process and the study on the spatial relation related to the component arrangement, because the individually dependent assembly procedure data and the component object data are cooperated by the cooperation means, and the result of the study can be known by a specific value such as the element working time. Therefore, the production design over the overall process can be performed by using the experience of others from the assembly procedure data, i.e. the prior example, while requiring no individual experience. Particularly, when the component object is displayed in the virtual space, the coordinate data of the component object displayed by the coordinate data acquisition means is acquired, and based on the coordinate data thus acquired, the element working time is outputted. Therefore, the aforementioned problem of localization does not occur, and the production design can be promoted significantly easily.

Specifically, it is possible to realize a high-performance production design support device P capable of performing the production design over the whole process while studying the spatial relation between components, and capable of being easily used and treated in a general-purpose manner by anyone in a world of production in which an intensified competition about positively promoting overseas production is forced.

In addition, there is provided the assembly enabled relation determination means 14 that determines whether or not one component and the other components related to the component object shown in the virtual space have assembly enabled relation, based on the assembly procedure data managed by the cooperation management means 10, and when the assembly enabled relation. determination means 14 determines them to be in the assembly enabled relation, the element working time output means 13 outputs the element working time required for assembling the components, based on each coordinate data of one component object and the other component objects acquired by the coordinate data acquisition means 12. Therefore, the assembly procedure data and the component object data can be independently treated, provided that the cooperation management means 10 cooperatively manages them, and therefore a work efficiency is improved.

In addition, the assembly enabled relation determination means 14 dynamically determines whether or not the components in the virtual space have the assembly enabled relation, based on the assembly procedure managed by the cooperation management means 10, and based on the determination result, the element working time output means 13 outputs the element working time related to the components. Therefore, the worker can know the element working time related to the assembly of the component object by a significantly easy work such as displaying the component object at a desired position on the virtual space. Namely, while requiring no individual experience, an optimal design of the production line can be easily performed by anyone, by using the assembly procedure data, which is a prior example.

Also, when the components are determined to have the relation not to be able to assemble in the combination of the components in the assembly procedure data, it is possible to surely know that the components are not in the assembly enabled relation, because the first report means 15 is provided to report accordingly. Therefore, it is possible to surely know that the components don't have the assembly enabled relation, and thus an unnecessary load is not imposed on the worker. Particularly, the first report means 15 reports the information suggesting the combination of assembly enabled components, as well as the information showing that the components have relation not to be able to assemble. Therefore, the user can surely know the combination of the assembly enabled components, and the workability can be improved.

In addition, when the components are determined to have relation not to be able to assemble in the assembling order in the assembly procedure data, it is possible to surely know that the assembly procedure of the work is wrong, because the second report means 16 is provided to report accordingly, and thus the unnecessary load is not imposed on the worker. Particularly, the second report means 16 reports the information suggesting the assembly enabled procedure capable of assembling, as well as the information showing the relation not to be able to assemble. Therefore, the user can surely know the assembly enabled procedure capable of assembling, and thus the workability can be improved.

There is provided the object moving instruction reception means 17 that receives the instruction to move the object displayed in the virtual space to an arbitrary position in the virtual space, and the object display means 11 displays the object, following the object moving instruction received by the object moving instruction reception means 17. Therefore, the arrangement position of the component object and the component supply unit object can be arbitrarily changed, and the element working time at a changed place can be known.

Further, the virtual space is composed of one or a plurality of virtual space elements, and there is provided a joint J whereby the virtual space element, the component object, and the component supply unit object are mutually connected, and the object is moved to an arbitrary position in the virtual space following the connection of the joint J. Therefore, if the object has the aforementioned joint, the object is moved following the connection of the joint J when the object is arranged on the virtual space. Accordingly, even if the object is arranged at an unspecific position, the object is automatically moved to an assembly enabled position and connected thereto by the joint J, and thus an accurate operation is not required. Namely, operability is improved.

In addition, there is provided the assembly procedure data reception means 18 for receiving the assembly procedure data related to a prescribed product or the assembly procedure data related to other product different from the prescribed product. Therefore, the laborsaving of the production design can be promoted by using the assembly procedure data thus received.

Still further, there is provided the assembly procedure data edit instruction reception means 19 that receives the instruction to edit at least one of the data of the combination and the assembling order of the components in the assembly procedure data. Therefore, multifarious production designs of products can be flexibly performed.

Moreover, there is provided the cooperation management data storage means that stores the assembly procedure data and the component object data cooperatively managed by the cooperation management means 10, as cooperatively managed data in a manner of being cooperatively managed. Therefore, cost can be reduced as an overall production site, by applying the cooperation management data to other product.

Further, there is provided the graphic element work display means 23 that displays on screen the element working time outputted by the element working time output means 13, as a graphic element work whereby the element working time is converted into graphics correspondingly to the length of the element working time. Therefore, dispersion and concentration of the element work can be visually grasped.

In addition, there is provided the graphic element work display change instruction reception means 24 that receives the display change instruction related to the change of the display such as addition, deletion, and rearrangement of the graphic element work, and the graphic element work display means 23 displays the graphic element work, following the display change instruction received by the graphic element work display change instruction reception means 24. Therefore, the design of the flexible production line can be performed by changing the element work.

Further, there is provided the assembly enabled relation determination means 14 that determines whether or not one component and the other components related to the component object displayed in the virtual space have assembly enabled relation, based on the assembly procedure data managed by the cooperation management means 10, and when the graphic element work display change instruction reception means 24 receives the display change instruction, the assembly enabled relation determination means 14 determines whether or not the component object related to the graphic element work received by the graphic element work display change instruction reception means 24 is in the assembly enabled state, with reference to the cooperation management means 10. Therefore, the usability of the user can be improved.

Further, there is provided the distance corresponding element working time data storage means 25 that arranges the element working time and the separation distance into a set and stores a plurality of sets of them, because the element working time is changed by the separation distance between one component object and the other component objects, and the element working time output means 13 refers to the distance corresponding element working time data storage means 25 and determines and outputs the element working time corresponding to the separation distance. Therefore, when the element working time is outputted, the unnecessary load is not imposed on a machine.

In addition, there is provided the worker characteristic data storage means 26 that stores the worker characteristic data obtained by converting the work characteristic of the individual worker related to the element working time into data, and the element working time output means 13 outputs the element working time that reflects the individual characteristic of the worker by using the worker characteristic data stored in the worker characteristic data storage means 26. Therefore, further accurate element working time can be outputted.

There is provided the tact time display means 27 for displaying on screen the tact time related to the product, and the tact time and the element working time are displayed in an overlapped manner. Therefore, the target of the production design can be made clear.

There are provided the tact time parameter reception means 28 that receives the tact time parameter for setting the tact time, and the tact time calculating means 29 that calculates the tact time based on the tact time parameter received by the tact time parameter reception means 28, and the tact time display means 27 displays on screen the tact time calculated by the tact time calculating means 29. Therefore, even if the fluctuation of the tact time occurs, the production design can be easily performed in accordance with the fluctuation.

Further, the component object data has the weight data showing the weight of the component in the real space, and the object display means 11 displays the component supply unit for supplying a prescribed component in the virtual space as the component supply unit object, and there is provided the total weight calculating means 32 that calculates based on the weight data the total weight data of the total weight of one or a plurality of components related to one or a plurality of component objects that can be held by the component supply unit object. Therefore, the load imposed on the worker due to the component weight can be suitably estimated.

In addition, the component object data and the component supply object data have the gravity center position data showing each gravity center position in the real space, and there is provided the arrangement balance state data calculating means 33 that calculates the arrangement balance state of the component held by the component supply unit as the arrangement balance state data, from the gravity center position data and the weight data of the component object or the total weight data calculated by the total weight calculating means 32, and the gravity center position data of the component supply unit object. Therefore, by calculating the moment from the gravity center position data and the weight data, the load imposed on the worker, which is further close to the actual situation, can be estimated.

The arrangement balance state data calculating means 33 calculates the arrangement balance state data, for each work shown by the assembling order of the assembly procedure data managed by the cooperation management means 10. Therefore, it can be known what order should be taken to work for performing the stable work. Specifically, it can be previously known in time series, what order should be taken to work for performing the stable work, and therefore the production design with further improved productivity becomes possible.

Further, there is provided the workability information output means 34 that outputs the workability information related to the workability of the worker, based on the arrangement balance state data calculated by the arrangement balance state data calculating means 33. Therefore, the workability of the worker can be specifically known as the workability information, and the production design can be suitably used as an index of smoothly promoting the production design. Moreover, the workability information outputted by the workability information output means 34 serves as the warning information showing that the arrangement balance state is estimated to have an adverse affect on the work. Therefore, its effect becomes remarkable.

Note that the present invention is not limited to the above-described embodiments in detail.

For example, in this embodiment, the element working time is outputted from the distance between component objects by the element working time output means 13. However, conversely, the distance between component objects may be obtained from the element working time. In this case, for example, by providing the element working time reception means that receives the element working time, the distance between component objects corresponding to the element working time received by the element working time reception means is outputted, with reference to the data stored in the distance corresponding element working time data storage means 25.

In addition, one of the modes is taken, out of the mode in which the joint is previously set and the mode in which the joint is not set. However, by providing a joint providing means that can dynamically gives the joint to the object in which the joint is not set, the operability can be improved.

The tact time may be displayed as a production target as shown in this embodiment, the tact time related to the product under study by equipment of the present invention, i.e. total element working time may be displayed.

In addition, instead of the reproductivity calculation display means 20 and the fitness determination result reception means 21, the fitness determination means may be provided.

The fitness determination means determines whether or not the reproductivity obtained based on the character string of the search source and the character string of the search destination shows a prescribed value or more, and when the value thus obtained is the prescribed value or more, determines that the search source and the search destination related to the value have a relation to be able to cooperate, and when the value shows a smaller value than the prescribed value, determines that they have a relation not to be able to cooperate. The method of obtaining the reproductivity is the same as that described above, and therefore the explanation is omitted.

In addition, it is determined whether or not the reproductivity thus obtained shows the prescribed value or more, and when the value is the prescribed value or more, the search source and the search destination related to the value are determined to have the relation to be able to cooperate, and when the value shows the smaller value than the prescribed value, they are determined to have the relation not to be able to cooperate.

Accordingly, even when a temporary component number which is abbreviated such as "BRKLMP", "BRKPAD", and "BRK" is given, the search destination and the search source can be dynamically cooperated based on the reproductivity. Therefore, the component, to which a formal component number has not been given, can be suitably responded.

Note that by not using the metadata but using the component management number and the component object management number, the assembly procedure data and the component object data may be cooperated. In this case, instead of the fitness determination means, there is provided a similar/dissimilar relation determination means (not shown) that determines whether or not the component management number and the component object management number have all matching relation or at least partially matching relation, and when the similar/dissimilar relation determination means determines that they have matching relation or similar relation, the cooperation management means 10 may cooperatively manage the assembly procedure data and the component object data having matching relation or similar relation.

As a method of determining whether or not they have similar relation, for example, there is a method of a so-called keyword search such as observing matches of front side, rear side, or in the center in an optional digit.

Figure 25:
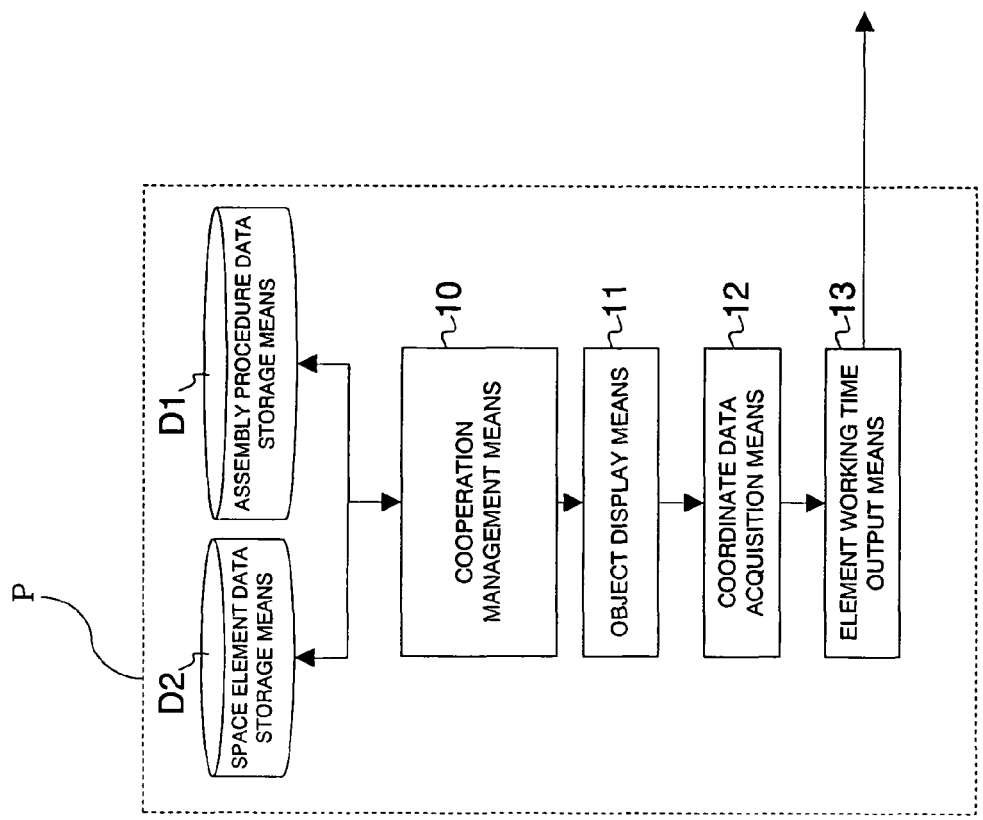
FIG. 25 is a block diagram of the function of the production design support facility in other embodiment of the present invention.
Figure 26:
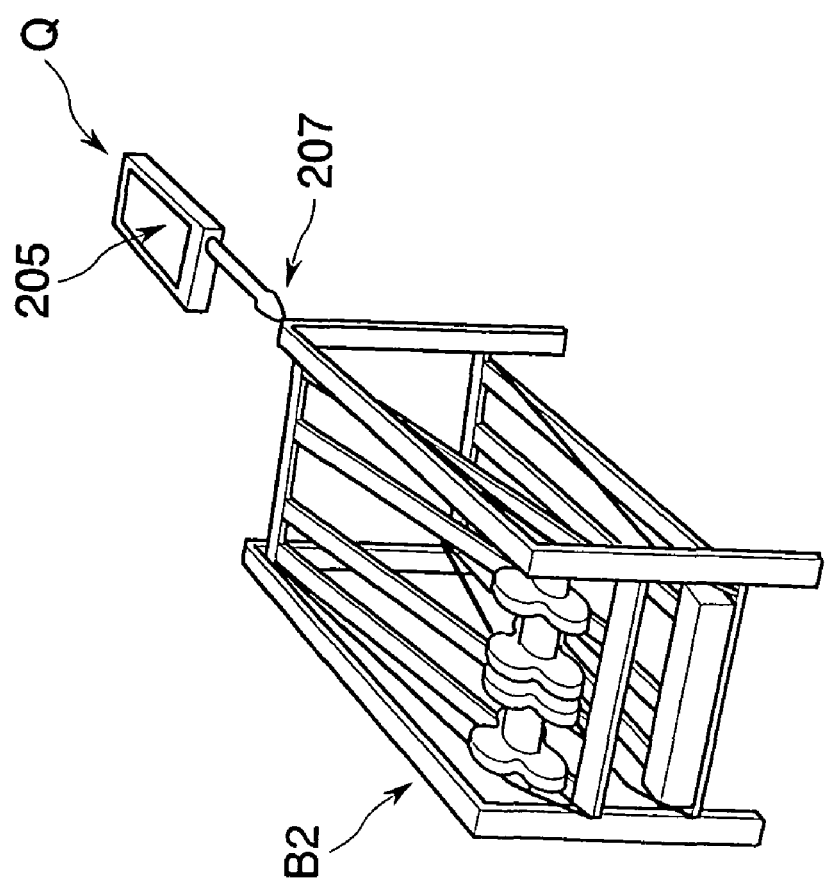
FIG. 26 is a perspective view showing a using aspect of the production design verification device in other embodiment of the present invention.

Further, in this embodiment, the production design support facility is constituted by the production design support device P, which is a stand-alone equipment. However, as shown in FIG. 25, the production design support facility may also be constituted by the production design support device P which is terminal device being connected to be able to communicate via a communication line network such as internet and a server device (not shown).

In this case, preferably, each means of the object display means 11, the coordinate data acquisition means 12, and the element working time output means 13 are provided in the production design support device P, and the element working time output means 13 outputs the element working time to the server device, and this element working time is subjected to appropriate processing at the server device.

In addition, another embodiment is also possible, such that the production design support device P is used together with a production design verification device Q, which is a prescribed external device for verifying a production design content already designed.

A specific explanation in this case will be given hereunder.

Second Embodiment

First, the production design verification device Q will be explained. The production design verification device Q is a portable information processing apparatus having a general information processing function and a radio communication function, and corresponds to a PDA and a small-sized personal computer, etc, having a communication card inside or connected thereto.

Figure 27:
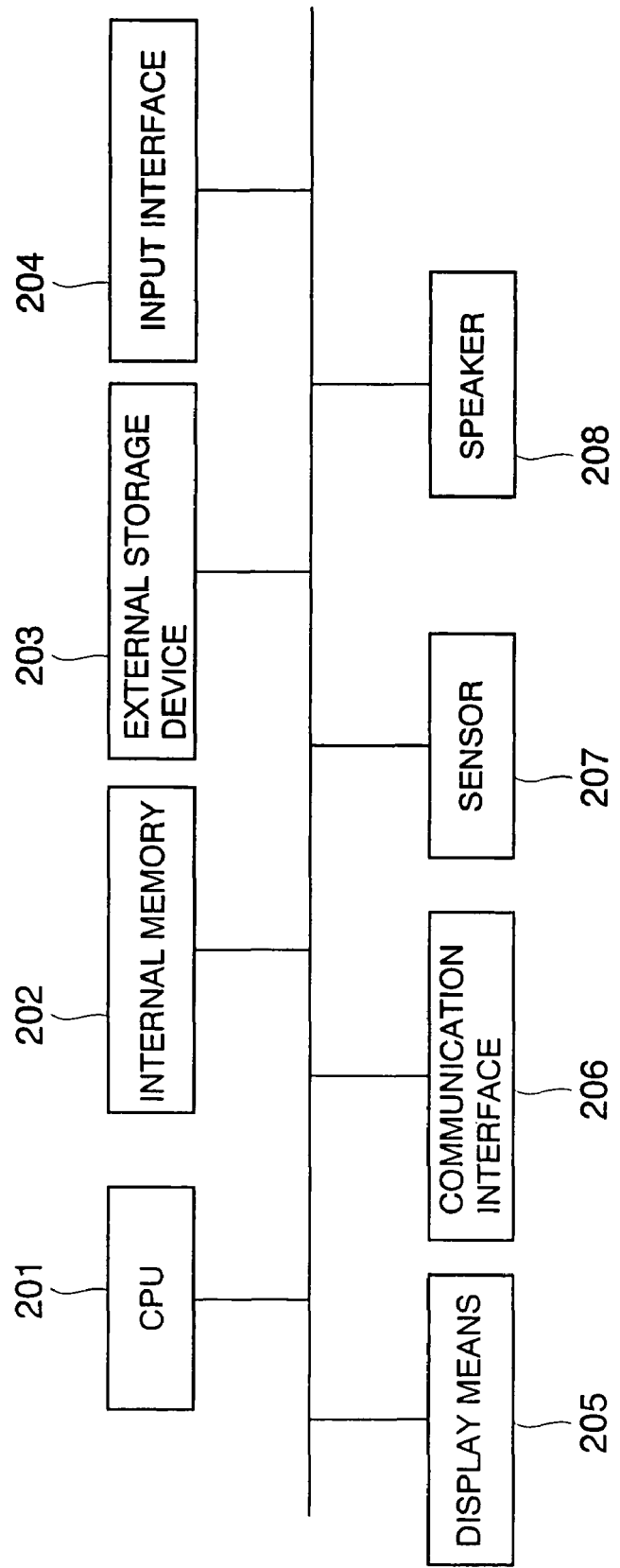
FIG. 27 is a block diagram of the equipment of the production design verification device in the other embodiment.

As shown in FIG. 27, the production design verification device Q includes a CPU 201, an internal memory 202, an external storage device 203 such as HDD, an input interface 204 such as a mouse and keyboard, display means 205 such as a liquid crystal display, a communication interface 206 for performing radio communication with the production design support device P, a sensor 207, and a speaker 208, etc.

Figure 28:
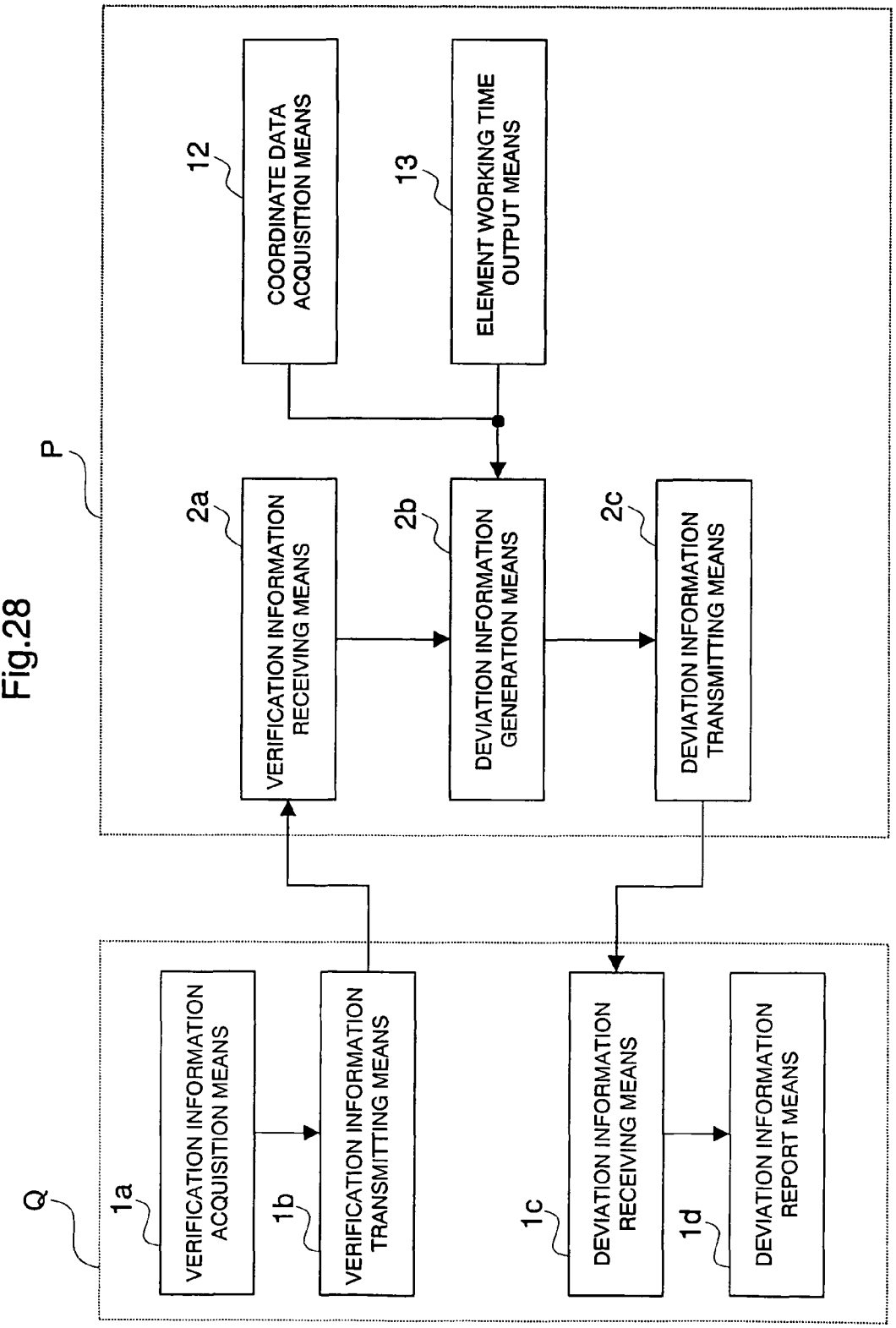
FIG. 28 is a block diagram of the function of the production design support facility and the production design verification device in the other embodiment.

The production design verification device Q causes the CPU 201 and peripheral equipment to activate following a prescribed program stored in the internal memory 202, and as shown in FIG. 28, exhibits a function as verification information acquisition means 1a, verification information transmitting means 1b serving as verification information output means, deviation information reception means 1c serving as a deviation information reception means, and a deviation information report means 1d, etc.

Each means will be explained hereunder.

The verification information acquisition means 1a acquires verification information for verifying a deviation between execution content and the production design content, from the execution content performed in the real space based on the production design content performed by the production design support device P, wherein the aforementioned sensor 207, etc, is used.

To explain more specifically, in this embodiment, as the verification information, positional information showing a position of a subject arranged n the real space is acquired, based on the production design content. Accordingly, a polhemus sensor (magnetic sensor) capable of sensing the positional information is adopted as the sensor 207. Note that instead of the polhemus sensor, a GPS sensor may be used as the sensor 207.

In addition, the verification information thus acquired may be selected as execution time information showing execution time of one or a plurality of element works actually performed in the real space based on the production design content. Thus, in a case of acquiring the execution time information, the execution time can be measured when the sensor 207, e.g. a pressure sensor, is provided in the component supply unit, etc, so as to be brought into contact with the components and jigs.

Thus, for example, the verification information acquisition means is constituted by a limit switch or an optical sensor capable of detecting an existence of an object, for detecting that an assembly is carried, detecting that component, the jig, and a tool are assembled, and detecting that the component, the jig, and tool are taken away. Alternately, the verification information acquisition means may be suitably constituted correspondingly to the verification information to be acquired, in such a way that the verification information acquisition means is constituted by a switch for expressly marking (such as a time stamp) start and end of the work as time elapses.

The verification information transmitting means 1b transmits the verification information acquired by the verification information acquisition means 1a to the production design support device P, wherein the aforementioned communication interface 206, etc, is used.

The deviation information reception means 1c receives deviation information as will be described later, from the production design support device P, wherein the aforementioned communication interface 206, etc, is used.

The deviation information report means 1d reports the deviation information received by the deviation information receiving means 1c, wherein the display means 205, etc, is used. Note that when the deviation information can be reproduced by sound, the deviation information report means 1d can be constituted by using a speaker, etc.

Meanwhile, only the function newly added to the function of the first embodiment will be explained for the production design support device P.

The production design support device P causes the CPU 101 and the peripheral equipment to activate following the production design support program stored in the internal memory 102, and further as shown in FIG. 28, has the function as verification information receiving means 2a serving as the verification information reception means, deviation information production means 2b, and deviation information transmitting means 2c serving as the deviation information output means, in addition to the coordinate data acquisition means 12 and the element working time output means 13 explained in the first embodiment. Note that in FIG. 28, as to each means other than the coordinate data acquisition means 12 and the element working time output means 13 shown in the first embodiment, diagrammatic representation and explanation are omitted.

Each means will be explained hereunder.

The verification information receiving means 2a receives the verification information from the production design verification device Q, wherein the aforementioned communication interface 106, etc, is used.

The deviation information production means 2b generates the deviation information, based on at least one of the data (i.e. production design content) of the coordinate data acquired by the coordinate data acquisition means 12 and the element working time outputted by the element working time output means 13, and the verification information received by the verification information receiving means 2a. Note that for simplifying the explanation, as to a cache temporarily storing the element working time and the coordinate data, the explanation is omitted.

The deviation information will be explained. Error between an actual position at which the component, etc, is actually arranged and a prearranged estimated position at which the component, etc, is supposed to be arranged is defined as the deviation information. Note that the actual position is acquired by the verification information acquisition means 1a, and the prearranged position is shown by the coordinate data outputted by the coordinate data acquisition means 12.

In addition, the error between an execution time required for an actual working performance and an estimated time estimated to be necessary for the working performance is also defined as the deviation information. Note that the execution time is obtained based on the verification information received by the verification information acquisition means 1a, and the estimated time is obtained by the element working time outputted by the element working time output means 13.

The deviation information transmitting means 2c transmits the deviation information generated by the deviation information production means 2b, to the production design verification device Q, wherein the aforementioned communication interface 106, etc, is used.

Next, an operation of the production design verification device Q will be explained by using a flowchart.

First, as shown in FIG. 29, for example, when the verification information acquisition means 1a acquires the verification information by making the sensor 207 of the production design verification device Q come into contact with a corner portion of an object supply unit B2 serving as an object (step S701); the verification information transmitting means 1b transmits the verification information thus acquired to the production design support device P at almost real time (step S702).

Then, when the deviation information receiving means 1c receives the deviation information from the production design support device P (step S703), the deviation information report means 1d reports the deviation information thus received by the deviation information receiving means 1c (step S704).

Next, the operation of the production design support device P will be explained by using a flowchart.

First, as shown in FIG. 30, when the verification information receiving means 2a receives the verification information from the production design verification device Q (step S801), the deviation information production means 2b generates the deviation information, based on the verification information received by the verification information receiving means 2a, the coordinate data acquired by the coordinate data acquisition means 12, and the element working time outputted by the element working time output means 13 (step S802). Then, the deviation information transmitting means 2c transmits the deviation information generated by the deviation information production means 2b, to the production design support device P (step S803).

Thus, the production design support device P according to this embodiment is capable of accurately performing the production design content based on the verification information and converging the operation studied on the embodiment to further accurate estimation.

In addition, the production design verification device Q used with the production design support device P comprises the verification information acquisition means 1a that acquires the verification information for verifying the deviation between the execution content and the production design content, from the execution content performed in the real space based on the production design content, and the verification information transmitting means 1b that outputs to outside the verification information acquired by the verification information acquisition means 1a. Therefore, while the production design verification device Q is a distinct device from the production design support device P, the production design verification device Q can be efficiently utilized in such a way that the production design content can be accurately performed correspondingly to the production design content performed in the real space and the operation studied on the embodiment can be converged to more accurate estimation.

Note that the present invention is not limited to the embodiments as described above in detail.

For example, although the polhemus sensor is adopted in the sensor 207 of the production design verification device Q, it can be replaced with a vision sensor capable of acquiring the positional information of the object from an image. When the vision sensor is adopted, a point to be measured (such as a machine original point, a corner as a characteristic of a machine structure, a region of human being, and tool, jig, and facility themselves, etc.) are previously marked, and the production design verification device Q is arranged apart at a position at which the point can be photographed.

Also, although the verification information output means is defined as the verification information transmitting means 1b, another embodiment is possible, such that the verification information can be outputted to a recording medium such as a CD-ROM instead of transmitting it. Similarly, the deviation information output means is defined as the deviation information transmitting means 2c, another embodiment is possible, such that the deviation information is outputted to the recording medium such as a CD-ROM instead of transmitting it.

Also, although the verification information receiving means is defined as the verification information receiving means 2a, the verification information recorded in the recording medium such as a CD-ROM may be received, or the verification information inputted by the input interface 104 may be received. Similarly, although the deviation information receiving means is defined as the deviation information receiving means 1c, the verification information recorded in the recording medium such as a CD-ROM may be received and the verification information inputted by the input interface 204 may be received.

In addition, the deviation information can be correction information for correcting the deviation between the production design content and the execution content.

For example, as the correction information, a direction and a distance for moving the component, etc, is converted into vector information for eliminating the positional deviation between the execution position and the prearranged position, or a difference between the execution time and the estimated time is expressed by a value for eliminating a timewise deviation.

The deviation information reported by the deviation information report means 1d may not only be displayed by the display means 205 but may also be outputted as sound. When the deviation information is the correction information, loudness of the outputted sound is changed in accordance with the change with time of the correction information received by the deviation information receiving means 1c. This provides an advantage that a person who performs correction can know the effect of the correction.

In addition, it may also be so designed that the display means 205 displays the actual position (present position) and the prearranged position in an overlapped manner.

Although the deviation information is generated by the production design support device P, another embodiment is also possible such that the deviation information is generated by the production design verification means Q.

Further, it is also possible for the deviation information is generated by an external device other than the production design support device P and the production design verification device Q.

A specific structure of each part is not limited to the above-described embodiments, and various modifications thereof are possible in a scope not departing from the gist of the present invention.

INDUSTRIAL APPLICABILITY

As described above, according to the present invention, it is possible to realize a high-performance production design support facility capable of performing the production design over the whole process while studying the spatial relation between components, and capable of being easily used and treated in a general-purpose manner by anyone in a world of production in which an intensified competition about positively promoting overseas production is forced.

The invention claimed is:

1. Production design support facility designed to be capable of performing a production design of a prescribed product present in a real space and formed by assembling prescribed components, by displaying the components in a virtual space, comprising:
   said production design support facility receives an input from a user to arrange a plurality of component objects by copying the component objects within a virtual space configured as a working space;
   cooperation management means for associating assembly procedure data showing combination of the assembly enabled components and assembling order thereof with data for each of the plurality of component objects so that each of the component objects are configured for display in the virtual space, said cooperation management means managing the component objects;
   object display means for displaying each of the component objects in the virtual space based on the data for each of the plurality of component objects;
   coordinate data acquisition means for acquiring coordinate data of each of the component objects arranged within the virtual space based on the received input from the user and displaying each of the component objects in the virtual space by the object display means; and
   element working time output means for outputting an element working time required for an assembly of one component object with other component object in the working space on the basis of a distance between these component objects arranged within the virtual space, said distance is computed from the acquired coordinate data, and assembly procedure data related to the objects and cooperatively managed by the cooperation means.

2. The production design support facility according to claim 1, comprising assembly enabled relation determination means for determining whether or not one component and the other components related to the component object displayed in the virtual space have assembly enabled relation, based on the assembly procedure data managed by the cooperation management means,
   wherein when the assembly enabled relation determination means determines that the components have assembly enabled relation, the element working time output means outputs the element working time required for the assembly of the components, based on each coordinate data of one component object and the other component objects acquired by the coordinate data acquisition means.

3. The production design support facility according to claim 2, comprising:
   first report means for reporting the information showing that the components are not in an assembly enabled relationship in a combination of the components in the assembly procedure data, when the assembly enabled relation determination means determines accordingly.

4. The production design support facility according to claim 3, wherein the first report means reports the information showing that the components are not in the assembly enabled relationship, or the information suggesting the combination of assembly enabled components, instead of the information showing that the components are not in the assembly enabled relationship.

5. The production design support facility according to claim 2, comprising:
   second report means for reporting the information showing that the components are not in the assembly enabled relationship in the combination order in the assembly procedure data, when the assembly enabled relation determination means determines accordingly.

6. The production design support facility according to claim 5, wherein the second report means reports the information showing that the components are not in the assembly enabled relationship, or the information suggesting an assembly enabled assembly procedure, instead of the information showing that the components are not in the assembly enabled relationship.

7. The production design support facility according to claim 1, comprising:
   object moving instruction reception means for receiving an instruction to move the component object displayed in the virtual space to an arbitrary position in the virtual space, as an object moving instruction,
   wherein the object display means is adapted to display the component object according to the object moving instruction received by the object moving instruction reception means.

8. The production design support facility according to claim 7,
   wherein the object display means displays a component supply unit for supplying a prescribed component in the virtual space as a component supply unit object, based on component supply unit object data;
   the cooperation management means cooperates and manages assembly procedure data and the component supply unit object data, assembly procedure data further showing a combination of the prescribed component and the component supply unit object; and
   the object moving instruction reception means is further adapted to receive an instruction to move the component supply unit object displayed by the object display means, to the arbitrary position in the virtual space, as an object moving instruction.

9. The production design support facility according to claim 8 in which the virtual space is composed of one or a plurality of virtual space elements, comprising:
   a joint capable of mutually connecting the virtual space element, the component object, and the component supply unit object,
   wherein the movement of the object to the arbitrary position in the virtual space is adapted to perform according to the joint.

10. The production design support facility according to claim 1, comprising:
    assembly procedure data reception means for receiving the assembly procedure data related to the prescribed product or for receiving the assembly procedure data related to other product different from the prescribed product.

11. The production design support facility according to claim 1, comprising:
    assembly procedure data edit instruction reception means for receiving an instruction to edit at least one of the data of a combination and an assembling order of the component in the assembly procedure data.

12. The production design support facility according to claim 1, wherein
    the component is managed by a component management number, and the component object data is managed by a component object management number, and
    the cooperation management means cooperates and manages the assembly procedure data and the component object data, by forming the assembly procedure data by associating the component number and the component object management number and by associating at least one of the combination of the component and the assembling order thereof, and the component number and the component object management number.

13. The production design support facility according to claim 1,
wherein the component object data is described by associating with metadata by which the component related to the component object data or a prescribed concept on the component can be recalled.

14. The production design support facility according to claim 13, comprising:
fitness determination means for determining whether or not the metadata becoming a search source and the metadata becoming a search destination are fitted to each other, based on the metadata becoming the search source and the metadata becoming the search destination,
wherein when the fitness determination means determines that they are fitted to each other, the cooperation management means is adapted to cooperate and manage the metadata becoming the search source and the metadata becoming the search destination.

15. The production design support facility according to claim 14, wherein
the metadata at least includes a character string; and
in the character string in the metadata becoming the search source and the character string in the metadata becoming the search destination, the fitness determination means calculates a degree of an appearance of the character string in one of the metadata, in the character string in the other metadata, and when the degree shows a prescribed value or more, determines that the metadata becoming the search source and the metadata becoming the search destination are fitted to each other.

16. The production design support facility according to claim 1, comprising:
cooperation management data storage means for storing the assembly procedure data and the component object data cooperated and managed by the cooperation management means, as cooperation management data in a manner of being cooperated and managed.

17. The production design support facility according to claim 1, comprising:
graphic element work display means for displaying on screen the element working time outputted by the element working time output means, as a graphic element work that converts the element working time into graphics so as to correspond to a length of the element working time.

18. The production design support facility according to claim 17,
wherein the product is completed through one or a plurality of steps, and the steps are constituted by one or a plurality of element works, and when a plurality of steps are present, the graphic element work display means displays on screen the graphic element works by arranging them in a prescribed order for each step.

19. The production design support facility according to claim 18, wherein the prescribed order is a work order.

20. The production design support facility according to claim 19, comprising:
graphic element work display change instruction reception means for receiving a display change instruction related to the change of a display such as addition, deletion, and rearrangement of the graphic element work,
wherein the graphic element work display means displays the graphic element work according to the display change instruction received by the graphic element work display change instruction receiving means.

21. The production design support facility according to claim 20, comprising:
assembly enabled relation determination means for determining whether or not one component and the other components related to a component object displayed in a virtual space have an assembly enabled relation, based on assembly procedure data managed by the cooperation management means,
wherein when the graphic element work display change instruction receiving means receives the display change instruction, the assembly enabled relation determination means determines whether or not the component object related to the graphic element work received by the graphic element work display change instruction receiving means is in an assembly enabled state, with reference to the cooperation management means.

22. The production design support facility according to claim 21,
wherein when the assembly enabled relation determination means determines that the component object related to the graphic element work received by the graphic element work display change instruction receiving means is in the assembly enabled state, the element work output means outputs the element working time corresponding to the component object related to the graphic element work received by the graphic element work display change instruction receiving means.

23. The production design support facility according to claim 1,
wherein the element working time includes at least one of a man element working time showing a working time by a worker and a machine element working time showing the working time by a machine, and
the element working time output means divides the element working time into the man element working time and the machine element working time and outputs them.

24. The production design support facility according to claim 1 in which the element working time changes by a separation distance between one assembly enabled component object and other assembly enabled component objects, comprising:
distance corresponding element working time data storage means for arranging the element working time and the separation distance into a set and stores a plurality of sets of them,
wherein the element working time output means refers to the distance corresponding element working time data storage means, and determines and outputs the element working time corresponding to the separation distance.

25. The production design support facility according to claim 1,
wherein the element working time linearly or non-linearly changes in accordance with the separation distance between component objects in the virtual space, and
the element working time output means calculates the element working time, from the separation distance between component equipment objects in the virtual space, and outputs it at almost real time.

26. The production design support facility according to claim 25, comprising:
worker characteristic data storage means for storing worker characteristic data obtained by converting work characteristics of an individual worker related to the element working time into data,
wherein the element working time output means outputs the element working time that reflects characteristics of the individual worker, by using the worker characteristic data stored in the worker characteristic data storage means.

27. The production design support facility according to claim 1, comprising:
  tact time display means for displaying on screen a tact time related to the product.

28. The production design support facility according to claim 27, comprising:
  tact time parameter reception means for receiving a tact time parameter for setting the tact time;
  tact time calculating means for calculating the tact time based on the tact time parameter received by the tact time parameter reception means,
  wherein the tact time display means displays on screen the tact time calculated by the tact time calculating means.

29. The production design support facility according to claim 1, comprising:
  step display means for modeling one or a plurality of steps and displaying on screen them; and
  step display change instruction reception means for receiving the display change instruction related the change of such as addition, deletion, and rearrangement of a modeled step.

30. The production design support facility according to claim 29, comprising:
  assembly enabled relation determination means for determining whether or not one component and the other components related to a component object displayed in a virtual space have an assembly enabled relation, based on assembly procedure data managed by the cooperation management means,
  wherein when the step display change instruction reception means receives the display change instruction related to the change of the display such as addition, deletion, and rearrangement of the modeled step, the assembly enabled relation determination means determines whether or not the component object related to a step received by the step display change instruction reception means is in an assembly enabled state, with reference to the cooperation management means.

31. The production design support facility according to claim 30,
  wherein when the assembly enabled relation determination means determines that the component object related to the step received by the step display change instruction reception means is in the assembly enabled state, the element work output means outputs an element working time corresponding to the component object related to the step received by the step display change instruction receiving means.

32. The production design support facility according to claim 1,
  wherein the component object data has weight data showing a weight of a component in a real space, and the object display means displays a component supply unit in the virtual space for supplying a prescribed component as a component supply unit object, and
  total weight calculating means for calculating total weight data of a total weight of one or a plurality of components related to one or a plurality of component objects that can be held by the component supply unit object the cooperation management means comprises, based on the weight data.

33. The production design support facility according to claim 32, in which the component object data and component supply unit object data have gravity center position data showing each gravity center position in a real space, comprising:
  arrangement balance state data calculating means for calculating an arrangement balance state of a component held by a component supply unit, as arrangement balance state data, from the gravity center position data and the weight data of the component object or the total weight data calculated by the total weight calculating means and the gravity center position data of the component supply unit object.

34. The production design support facility according to claim 33,
  wherein the arrangement balance state data calculating means is adapted to calculate the arrangement balance state data for each work shown by an assembling order of an assembly procedure data managed by the cooperation management means.

35. The production design support facility according to claim 33, comprising:
  workability information output means for outputting workability information related to a workability of a worker, based on the arrangement balance state data calculated by the arrangement balance state data calculating means.

36. The production design support facility according to claim 35,
  wherein the workability information outputted by the workability information output means is warning information showing that the arrangement balance state has an adverse affect on a work.

37. The production design support facility according to claim 35,
  wherein the workability information outputted by the workability information output means is component object exchange information related to an exchange of a component object required for improving the arrangement balance.

38. The production design support facility according to claim 1, constituted by a terminal device and a server device, which are connected so as to be able to communicate via a communication line network such as internet:
  wherein at least one or more means of the object display means, the coordinate data acquisition means, and the element working time output means is/are provided, in one or both of the terminal device and the server device.

39. The production design support facility according to claim 1, comprising:
  verification information reception means for receiving verification information for obtaining a deviation between production and the production design, for the production in the real space performed correspondingly to a production design content performed by using the virtual space; and
  deviation information production means for generating deviation information showing the deviation between the verification information and the production design content, based on the verification information received by the verification information reception means and the production design content.

40. The production design support facility according to claim 39,
  wherein the verification information is positional information showing a position of an object arranged on the real space based in the production design content.

41. The production design support facility according to claim 39,
  wherein the verification information is execution time information showing execution time of one or a plurality of element works actually performed in the real space based on the production design content.

42. The production design support facility according to claim 39,
  wherein the verification information reception means is a verification information receiving means for receiving the verification information from an external prescribed device.

43. The production design support facility according to claim 39,
wherein the deviation information is correction information for correcting the deviation.

44. The production design support facility according to claim 1, comprising:
deviation information output means for outputting the deviation information generated by the deviation information production means.

45. The production design support facility according to claim 44,
wherein the deviation information output means is a deviation information transmitting means for transmitting the deviation information to a prescribed external device.

46. A production design verification device used in executing a production design content in a real space, which is already performed in a virtual space of the production design support facility according to claim 1, comprising:
verification information acquisition means for acquiring verification information for verifying a deviation between an execution content and the production design content, from the execution content performed on the real space based on the production design content; and
verification information output means for transmitting the verification information acquired from the verification information acquisition means to outside of the production design verification device.

47. The production design verification device according to claim 46,
wherein the verification information is positional information showing a position of an object arranged on the real space based on the production design content.

48. The production design verification device according to claim 46,
wherein the verification information is execution time information showing an execution time of one or a plurality of element works performed in the real space based in the production design content.

49. The production design verification device according to claim 46,
wherein the verification information output means is verification information transmitting means for transmitting the verification information acquired by the verification information acquisition means, to the production design support facility at almost real time.

50. The production design verification device according to claim 46, comprising:
deviation information reception means for receiving from outside deviation information showing a deviation between the execution content and the production design content, based on the verification information outputted to outside by the verification information output means; and
deviation information report means for reporting the deviation information received by the deviation information reception means.

51. The production design verification device according to claim 50,
wherein the deviation information reception means is deviation information receiving means for receiving the deviation information from the production design support facility.

52. The production design verification device according to claim 50,
wherein the deviation information is correction information for correcting the deviation.

53. The production design verification device according to claim 46, which is a portable and wirelessly communicable terminal device.

54. A computer readable medium contains production design support program designed to perform a production design of a prescribed product present in a real space and formed by assembling a prescribed component by displaying the component in a virtual space by activating a computer, wherein when the program is executed by the computer implements steps, comprising:
a step where said production design support facility receives an input from a user to arrange a plurality of component objects by copying the component objects within a virtual space configured as a working space;
a cooperation management step that cooperates and manages assembly procedure data formed by showing a combination of an assembly enabled component and an assembling order thereof and data for each of the plurality of component objects so that each of the component objects are configured for display in the virtual space;
an object display step that displays each of the component objects in the virtual space based on the data for each of the plurality of component objects;
a coordinate data acquisition step that acquires coordinate data of each of the component objects arranged within the virtual space based on the received input from the user and displaying each of the component objects on the virtual space by the object display step; and
an element working time output step that outputs an element working time required for assembling one component object with other component object in the working space on the basis of a distance between these component objects arranged within the virtual space, said distance is computed from the acquired coordinate data, and assembly procedure data related to the one component object and the other component objects cooperatively managed by the cooperation management step.

* * * * *